United States Patent
Umoren et al.

(10) Patent No.: US 11,466,210 B2
(45) Date of Patent: Oct. 11, 2022

(54) BIOMEDIATED-TITANIUM NANOCOMPOSITE FOR CORROSION PROTECTION

(71) Applicant: King Fahd University of Petroleum and Minerals, Dhahran (SA)

(72) Inventors: Saviour A. Umoren, Dhahran (SA); Doga Kavaz, Dhahran (SA); Edidiong A. Essien, Dhahran (SA); Moses Monday Solomon, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/515,261

(22) Filed: Jul. 18, 2019

(65) Prior Publication Data
US 2020/0255734 A1    Aug. 13, 2020

Related U.S. Application Data

(60) Provisional application No. 62/805,030, filed on Feb. 13, 2019.

(51) Int. Cl.
| | | |
|---|---|---|
| *C09K 15/34* | (2006.01) | |
| *C23F 11/04* | (2006.01) | |
| *C23F 11/18* | (2006.01) | |
| *C23C 22/05* | (2006.01) | |

(52) U.S. Cl.
CPC .............. *C09K 15/34* (2013.01); *C23C 22/05* (2013.01); *C23F 11/04* (2013.01); *C23F 11/18* (2013.01); *A23V 2250/2131* (2013.01)

(58) Field of Classification Search
None
See application file for complete search history.

(56) References Cited

U.S. PATENT DOCUMENTS

| | | |
|---|---|---|
| 3,623,979 A | 11/1971 | Maddox, Jr. et al. |
| 3,629,104 A | 12/1971 | Maddox, Jr. et al. |
| 4,388,214 A | 6/1983 | Oppenlaender et al. |
| 5,700,764 A | 12/1997 | Walters et al. |
| 6,696,572 B2 | 2/2004 | Meyer |

(Continued)

FOREIGN PATENT DOCUMENTS

| | | |
|---|---|---|
| CN | 103498163 B | 8/2015 |
| CN | 106675322 A | 5/2017 |

(Continued)

OTHER PUBLICATIONS

English text machine translation of Ryu et al. (KR 2002-0051506 A) done by the Korean Intellectual Property Office, accessed online from the Espacenet Global Dossier; copy attached as a PDF, pp. 1-18. (Year: 2002).*

(Continued)

*Primary Examiner* — Katie L. Hammer
(74) *Attorney, Agent, or Firm* — Oblon, McClelland, Maier & Neustadt, L.L.P.

(57) ABSTRACT

The present invention relates to a method of inhibiting corrosion of steel in contact with a corrosive solution. The method involves mixing an olive leaf extract titanium nanocomposite with the corrosive solution. The olive leaf extract titanium nanocomposite may be made by reducing $TiCl_4$ with an olive leaf extract, which forms nanoparticles with an average size of 50-100 nm.

20 Claims, 17 Drawing Sheets

(56) References Cited

U.S. PATENT DOCUMENTS

| | | | |
|---|---|---|---|
| 10,221,368 B2 | 3/2019 | Benitez Aguilar et al. | |
| 2010/0139525 A1* | 6/2010 | Kolberg | C09D 5/084 |
| | | | 106/286.3 |
| 2011/0266502 A1* | 11/2011 | Gomes | C23F 11/10 |
| | | | 252/393 |
| 2012/0064140 A1* | 3/2012 | Qian | C08J 3/20 |
| | | | 424/421 |
| 2018/0305825 A1 | 10/2018 | Alkhaldi et al. | |

FOREIGN PATENT DOCUMENTS

| | | | |
|---|---|---|---|
| CN | 106957546 A | | 7/2017 |
| CN | 107384131 A | | 11/2017 |
| CN | 108130544 A | | 6/2018 |
| KR | 20020051506 A | * | 6/2002 |
| KR | 10-1735097 | | 5/2017 |

OTHER PUBLICATIONS

Okonkwo, et al. ; Thermal performance analysis of a parabolic trough collector using waterbased green-synthesized nanofluids ; Solar Energy 170 ; pp. 658-670 ; 2018 ; 14 Pages.

Ikhmal, et al. ; Anticorrosion Coating using *Olea* sp. Leaves Extract; IOP Conf. Series: Materials Science and Engineering 244; 2018; 12 Pages.

Bouknana, et al. ; Extracts of Olive Inflorescence Flower Pre-Anthesis, at Anthesis and Grain Pollen as Eco-Friendly Corrosion Inhibitor for Steel in 1M HCI Medium ; Analytical & Bioanalytical Electrochemistry, vol. 10, No. 6 ; pp. 751-777 ; 2018 ; 28 Pages.

Al-Saadie, et al. ; Corrosion inhibition for carbon steel in sea water using aqueous olive extract; Physical Chemistry An Indian Journal, vol. 10, Issue 3 ; pp. 102-109 ; 2015 ; 8 Pages.

Rahal, et al. ; Olive leaf extract as natural corrosion inhibitor for pure copper in 0.5 M NaCl solution: A study by voltammetry around OCP ; Journal of Electroanalytical Chemistry 769 ; pp. 53-61 ; Mar. 16, 2016 ; 10 Pages.

Ciolac, et al. ; Corrosion resistance of some stainless steels in titanium tetrachloride ; Revista de Chimie, V. 47(7); pp. 697-700 ; Abstract Only ; 2 Pages.

Jamshidnejad, et al. ; Synthesis of self-healing Smart Epoxy and Polyurethane Coating by Encapsulation of Olive Leaf Extract as Corrosion Inhibitor; International Journal of Electrochemical Science 13 ; pp. 12278-12293 ; 2018 ; Nov. 5, 2018 ; 16 Pages.

Guo, et al. ; Low-temperature chemical vapor deposition (CVD) of metallic titanium film from a novel precursor; Surface and Coating Technology, vol. 353 ; Nov. 15, 2018 ; pp. 18-24 ; Abstract Only ; 2 Pages.

EL-Etre ; Inhibition of acid corrosion of carbon steel using aqueous extract of olive leaves ; Journal opf Colloid and Interface Science 314 ; pp. 578-583 ; Jul. 12, 2007 ; 6 Pages.

Abdel-Gaber, et al. ; A natural extract as scale and corrosion inhibitor for steel surface in brine solution ; Desalination 278 ; pp. 337-342 ; Jun. 8, 2011 ; 6 Pages.

Bouknana, et al. ; Aqueous extracts of olive roots, stems, and leaves as eco-friendly corrosion inhibitor for steel in 1 MHCl medium ; Int. J. Ind. Chem. 6 ; pp. 233-245 ; Mar. 10, 2015 ; 13 Pages.

Pustaj, et al. ; Olive Leaf Extract as a Corrosion Inhibitor of Carbon Steel in CO2-Saturated Chloride-Carbonate Solution ; International Journal of Electrochemical Science ; pp. 7811-7829 ; Aug. 7, 2016 ; 19 Pages.

Pustaj, et al. ; Inhibition properties and adsorption behavior of olive leaf extract on N80 carbon steel in CO2-saturated brine solution ; Abstract Only ; 1 Page.

Essien, et al. ; Synthesis, characterization and anticorrosion property of olive leaves extract-titanium nanoparticles composite ; Journal of Adhesion Science and Technology ; Mar. 4, 2018 ; 23 Pages.

\* cited by examiner

BIOMEDIATED-TITANIUM NANOCOMPOSITE FOR CORROSION PROTECTION

CROSS REFERENCE TO RELATED APPLICATIONS

This application claims the benefit of priority from U.S. Provisional Application No. 62/805,030 filed Feb. 13, 2019, which is incorporated herein by reference in its entirety.

STATEMENT REGARDING PRIOR DISCLOSURES BY THE INVENTORS

Aspects of this technology are described in an article, Edidiong A. Essien, Doga Kavaz, Ekemini B. Ituen, and Saviour A. Umoren, "Synthesis, characterization and anti-corrosion property of olive leaves extract-titanium nanoparticles composite," *Journal of Adhesion Science and Technology*, (2018) 32, 1773-1794, DOI: 10.1080/01694243.2018.1445800, which is incorporated herein by reference in its entirety.

BACKGROUND OF THE INVENTION

Technical Field

The present invention relates to a method of inhibiting corrosion of steel using a nanocomposite of olive leaves extract and titanium.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Nanotechnology has many exciting applications with its unique advances and can easily merge with other technologies with some modifications. The use of nanostructured materials has provided more surface area for higher reaction rates which have been exploited in various fields including the study of the environment, medicine, textile, biotechnology, agriculture, food, energy, and drug delivery technologies. See Nayak D, Ashe S, Rauta P R, et al. Bark extract mediated green synthesis of silver nanoparticles: Evaluation of antimicrobial activity and antiproliferative response against osteosarcoma. Mater Sci Eng C. 2016; 58:44-52. These materials are fine grained with high grain boundary volume fraction. See Nalwa H S. Handbook of nanostructured materials and nanotechnology. New York (N.Y.): Academic Press; 1999. Various nanoparticles have been synthesized, mediated by various materials using many techniques. See Nasrollahzadeh M, Sajadi S M. Synthesis and characterization of titanium dioxide nanoparticles using *Euphorbia heteradena* Jaub root extract and evaluation of their stability. Ceramics Int. 2015; 41:14435-14439; Zulfiqar U, Subhani T, Husain S W. Synthesis and characterization of silica nanoparticles from clay. J Asian Ceramic Soc. 2016; 4:91-96; and Fazlzadeh M, Rahmani K, Zarei A, et al. A novel green synthesis of zero valent iron nanoparticles (NZVI) using three plant extracts and their efficient application for removal of Cr(VI) from aqueous solutions. Adv Powder Technol. 2017; 28:122-130. The material used for synthesis depends on the intended end use. Recently, scientists have synthesized nano-particles from plant biomasses because plant mediated materials are non-toxic and inexpensive. See Mittal A K, Chisti Y, Banerjee U C. Synthesis of metallic nanoparticles using plant extracts. Biotechnol Adv. 2013; 31:346-356. Plant-based nanoparticles have been applied in various areas, and recently as oilfield chemicals. See Santhoshkumar J, Kumar S V, Rajeshkumar S. Synthesis of zinc oxide nanoparticles using plant leaf extract against urinary tract infection pathogen. Resource-Efficient Technol. 2017. DOI:10.1016/j.reffit.2017.05.001; Logeswari P, Silambarasan S, Abraham J. Synthesis of silver nanoparticles using plants extract and analysis of their antimicrobial property. J Saudi Chem Soc. 2015; 19:311-317; Rasheed T, Bilal M, Iqbal H M, et al. Green biosynthesis of silver nanoparticles using leaves extract of *Artemisia vulgaris* and their potential biomedical applications. Coll Surf B Biointerf. 2017; 158: 408-415; Bell M R. A case for nanomaterials in the oil and gas exploration and production business. In: International Congress of Nanotechnology (ICNT); 2004 November; p. 7-10; and Lau H C, Yu M, Nguyen Q P. Nanotechnology for oilfield applications: challenges and impact. J Petroleum Sci Eng. 2017; 157:1160-1169. Oilfield chemicals are employed in the industry for drilling, completion and production of hydrocarbons. Nanoparticulates have been employed as additives to drilling mud to control fluid loss and wellbore stability and to remove toxic gases. See Paydar P, Ahmadi M. Characteristics of water-based drilling mud containing Gilsonite with Boehmite nanoparticles. Bulletin de laSociété Royale des Sciences de Liege. 2017; 86:248-258; and Abdo J, Haneef M D. Clay nanoparticles modified drilling fluids for drilling of deep hydrocarbon wells. Appl Clay Sci. 2013; 86:76-82. Cement spacers and cement properties enhancers have been designed at the nanoscale. See Fakoya M F, Shah S N. Emergence of nanotechnology in the oil and gas industry: Emphasis on the application of silica nanoparticles. Petroleum. 2017. DOI:10.1016/j.petlm.2017.03.001; and Ponmani S, Nagaraj an R, Sangwai J. Applications of nanotechnology for upstream oil and gas industry. J Nano Res. 2013; 24:7-15. Other oilfield chemicals for production and enhanced recovery have been designed in the nanoscale, including corrosion inhibitors and surfactants. See Bera A, Belhaj H. Application of nanotechnology by means of nanoparticles and nanodispersions in oil recovery—a comprehensive review. J Nat Gas Sci Eng. 2016; 34:1284-1309.

One important class of oilfield chemicals is corrosion inhibitors. Oilfield infrastructures such as pipelines, tubing, storage tanks etc. are made of carbon steel. See Ituen E, Akaranta O, James A. Green anticorrosive oilfield chemicals from 5-hydroxytryptophan and synergistic additives for X80 steel surface protection in acidic well treatment fluids. J Mol Liq. 2016; 224:408-419. The major problem associated with carbon steel is that it is prone to corrosion when it comes in contact with aggressive solutions such as acids (HCl, $H_2SO_4$) which are used in many oilfield operations such as descaling, oil well acidizing amongst others. It is practically impossible to stop corrosion of metals, but its rate can be reduced using some strategies. One of the strategies which is considered cost effective and practical is the deployment of corrosion inhibitors. They are mainly derived from organic molecules, polymers, and plant extracts. See Finšgar M, Jackson J. Application of corrosion inhibitors for steels in acidic media for the oil and gas industry: a review. Corros Sci. 2014; 86:17-41. Efficient corrosion inhibitors are often designed from materials that contain electron rich sites like oxygen, nitrogen, sulphur and multiple bonds. See Finšgar (2014). Many inventions have described corrosion inhibitor formulations for metal corrosion prevention in different kinds of corrosive environments. See J. Maddox, Jr., W. Schoen. Composition and process for inhibiting corrosion in oil wells. U.S. Pat. No. 3,623,979, 1971; J. Maddox, Jr. Water soluble corrosion inhibitors for well fluids. U.S. Pat. No. 3,629,104, 1971; K. Oppenlaender, K. Stork, B. Mannheim. Imidazoline based corrosion inhibitors which inhibit corrosion caused by $CO_2$ and $H_2S$. U.S. Pat. No. 4,388,214, 1983; J. L. R. Benitez Aguilar, A. Tobo Cervantes, A. Estrada Martinez, N. Navarro Ordonez. Corrosion inhibitors derived from vegetable oils and its process of obtaining. US Patent US 2017/0029960 A1, 2017; and G. R. Meyer. Corrosion inhibitor compositions including quaternized compounds. U.S. Pat. No. 6,696,572B2, 2004, each incorporated herein by reference in their entirety.

In recent times, composites formed between nanoparticles and organic molecules (polymers) have been reported to be effective in inhibiting corrosion of mild steel in acidic environments. See Solomon M M, Gerengi H, Umoren S A, et al. Gum Arabic—silver nanoparticles composite as a green anticorrosive formulation for steel corrosion in a strong acid media. Carbohyd Polym. 2018; 181:43-55; Solomon M M, Gerengi H, Kaya T, et al. Enhanced corrosion inhibition effect of chitosan for st37 steel in 15% $H_2SO_4$ environment by silver nanoparticles. Int J Biol Macromol. 2017; 104:638-649; Solomon M M, Gerengi H, Kaya T, et al. Performance evaluation of chitosan/silver nanoparticles composite on st37 steel corrosion in 15% HCl solution. ACS Sustainable Chem. Eng. 2017; 5:809-820; Solomon M M, Gerengi H, Umoren S A. Carboxymethyl cellulose/silver nanoparticles composite: Synthesis, characterization and application as a benign corrosion inhibitor for St37 Steel in 15% $H_2SO_4$ medium. ACS Appl Mater Interf. 2017; 9:6376-6389; Solomon M M, Umoren S A. In-situ preparation, characterization and anticorrosion property of polypropylene glycol/silver nanoparticles composite for mild steel corrosion in acid solution. J Coll Interf Sci. 2016; 462:29-41; Solomon M M, Umoren S A, Abai E J. Poly(methacrylic acid)/silver nanoparticles composites: In-situ preparation, characterization and anticorrosion property for mild steel in $H_2SO_4$ solution. J Mol Liq. 2015; 212:340-351; and Quadri T W, Olasunkanmi L O, Fayemi O E, et al. Zinc oxide nanocomposites of selected polymers: synthesis, characterization, and corrosion inhibition studies on mild steel in HCl solution. ACS Omega. 2017; 2:8421-8437. Reports are lacking on plant extract-nanoparticle composites used as corrosion inhibitors despite the fact that plant biomass is rich in various phyto-compounds that can be used to form nanoparticles as may serve as potential adsorption sites on metal surfaces to inhibit corrosion.

Nevertheless, there are numerous inventions on corrosion inhibitor formulation containing plant extracts. Alkhaldi and Al-Qahtani in the US Patent Publication 2018/0305825 A1 disclosed a composition comprising 20-300 ppm of a citrus leaf extract and 20-450 ppm of a second leaf extract (from saffron plant, almond plant, *Psidium guajava* plant, or *Origanum majorana* plant) can inhibit steel corrosion in 0.1-1 M inorganic acid at 20-30° C. In the Republic of Korea Patent KR101735097B1 invention, a composition containing sumac (*Rhus vernictflua*) extract was disclosed as a metal corrosion inhibitor in strong acid solution. See Il-min, C., Seung-hyun, K., Pravakaran. Composition containing *Rhus verniciflua* extract for corrosion inhibition and the method of corrosion inhibition using the same. Patent No. KR101735097B1, 2016. Extracts of various plants have been disclosed in the Chinese inventions CN103498163B and CN108130544A. See Wanqing, L., Wei, Y., Dan, R., Hualu, Z., Yuan, H., Yaru, C., Yuchen, Z. An environmentally friendly method of preparing and seawater corrosion inhibitor-containing plant extract. Patent No. CN103498163B, 2015 and Xianghong, L., Shuduan, D., Jianxiang, L. Plant compounded corrosion inhibitor as well as preparation method and application thereof. Patent No. CN108130544A—each incorporated herein by reference in their entirety.

Olive is a medicinal plant with scientific name *Oleaeuropaea*. The leaves extracts have been reported to exhibit antioxidant, anticancer, anti-inflammatory and other biological activities. See Ahmed A M, Rabii N S, Garbaj A M, et al. Antibacterial effect of olive (*Oleaeuropaea* L.) leaves extract in raw peeled undeveined shrimp (*Penaeus semisulcatus*). Int J Vet Sci Med. 2014; 2:53-56; Boss A, Bishop K S, Marlow G, et al. Evidence to support the anti-cancer effect of olive leaf extract and future directions. Nutrients. 2016; 8:513; and Khemakhem I, Abdelhedi O, Trigui I, et al. Structural, antioxidant and antimicrobial activities of polysaccharides extracted from olive leaves. Int J Biol Macromol. 2018; 106:425-432. There are reports in the literature relating to the corrosion inhibiting effect of olive leaves extract for metal substrates in different corrosive media. For instance, El-Etre reported that olive leaf extract showed good corrosion inhibitive performance for mild steel in 2 M HCl solution. See El-Etre A Y. Inhibition of acid corrosion of carbon steel using aqueous extract of olive leaves. J Coll Interf Sci. 2007; 314:578-583. Also, it has been reported as a useful scale and corrosion inhibitor for steel in brine solution. Aqueous extracts of olive roots, stems and leaves have also been reported as effective eco-friendly corrosion inhibitor for steel in 1 M HCl medium. See Abdel-Gaber A M, Abd-El-Nabey B A, Khamis E, et al. A natural extract as scale and corrosion inhibitor for steel surface in brine solution. Desalination. 2011; 278:337-342; and Bouknana D, Hammouti B, Caid H S, et al. Aqueous extracts of olive roots, stems, and leaves as eco-friendly corrosion inhibitor for steel in 1 M HCl medium. Int J Ind Chem. 2015; 6:233-245. The inhibition effect of olive leaf extract on corrosion of carbon steel in brine solutions saturated with $CO_2$ and $CO_2$-saturated chloride-carbonate solution can be found in the literature. See Pustaj G, Kapor F, Kvasnička P. Inhibition properties and adsorption behavior of olive leaf extract on N80 carbon steel in $CO_2$-saturated brine solution. Int J Mater Res. 2014; 105:992-998; and Pustaj G, Kapor F, Veinovic Z. Olive leaf extract as a corrosion inhibitor of carbon steel in $CO_2$-saturated chloride-carbonate solution. Int J Electrochem Sci. 2016; 11:7811-7829. It contains a variety of compounds such as luteolin, gallic acid, oleuropein, caffeic acid, hydroxytyrosoland tyrosol. See Hashmi M A, Khan A, Hanif M, et al. Traditional uses, phytochemistry, and pharmacology of *Oleaeuropaea* (olive). Evidence-Based Complement Alter Med. 2015. DOI:10.1155/2015/541591; and Santhoshkumar T, Rahuman A A, Jayaseelan C, et al. Green synthesis of titanium dioxide nanoparticles using *Psidium guajava* extract and its antibacterial and antioxidant properties. Asian Pacif J Trop. Med. 2014; 7:968-976. These compounds (FIG. 1) contain some functionalities that are rich in electrons similar to that of some established corrosion inhibitors and at the same time serves as reducing and capping agent capable of forming Ti nanoparticles from a solution of Ti(IV) chloride. See Finšgar et al. (2014).

It is a common industrial practice to use hydrochloric acid in a concentration range of 1-3 M for cleaning and pickling of scales. See M. Maanonen. Steel pickling in challenging conditions. Thesis, Materials Technology and Surface Engineering, Helsinki Metropolia University of Applied Sciences 2014. However, this practice often enhances the corrosion rate of the metals. Customarily, corrosion inhibitors are added to the acid bath before used. At present, the most effective corrosion inhibitors are inorganic (e.g., chromates, nitrites) and organic (mostly those with aromatic chains) but suffer from high toxicity and cost. See O. Gharbi, S. Thomas, C. Smith, N. Birbilis. Chromate replacement: what does the future hold? NPJ Materials Degradation 2 (2018) 12. There is high demand of environmentally benign, biodegradable, and effective as corrosion inhibitor that can be disposed of normally after used.

In view of the forgoing, one objective of the present invention is to provide a method and composition for corrosion inhibition using an olive leaf extract-titanium nanocomposite for mild steel in 1 M hydrochloric acid. The invention includes the preparation and use of OLE-Ti nano as an effective, safe and environmentally benign corrosion inhibitor for hydrochloric acid solutions in the temperature range of 30-60° C. The corrosion inhibitive action of OLE-Ti nano is a combined effect between titanium nanoparticles and the complex organic chemicals present in the olive leaves.

BRIEF SUMMARY OF THE INVENTION

According to a first aspect, the present disclosure relates to a method of inhibiting corrosion of steel in contact with a corrosive solution. The method involves mixing an olive leaf extract titanium nanocomposite (OLE-Ti nano) to a concentration of 5-500 ppm in the corrosive solution. The OLE-Ti nano is formed by mixing an organic solvent extract of olive leaves with an alcohol, water, and $TiCl_4$.

In one embodiment, the OLE-Ti nano is in the form of a particle dispersion comprising particles having an average diameter in a range of 50-100 nm.

In a further embodiment, the particles comprise Ti metal.

In a further embodiment, the Ti metal comprises crystalline Ti metal.

In one embodiment, the corrosive solution is an aqueous solution comprising a salt or an inorganic acid, the salt or the inorganic acid having a concentration of 0.5-4 M.

In a further embodiment, the inorganic acid is present, and the inorganic acid is at least one selected from the group consisting of nitric acid, hydrochloric acid, hydrofluoric acid, sulfuric acid, and perchloric acid.

In a further embodiment, the salt is present, and the salt is at least one selected from the group consisting of a chloride salt, a carbonate salt, a bicarbonate salt, and a sulfate salt.

In one embodiment, the corrosive solution has a temperature in a range of 30-80° C.

In one embodiment, the steel comprises 0.05-1.0 wt % carbon relative to a total weight of the steel.

In one embodiment, a corrosion rate of the steel is 85-99.9% less than a substantially similar piece of steel in contact with a substantially similar corrosive solution that does not comprise OLE-Ti nano.

In a further embodiment, a corrosion rate of the steel at 50-65° C. is 85-90% less than a substantially similar piece of steel in contact with a substantially similar acidic solution that does not comprise OLE-Ti nano.

In a further embodiment, a corrosion rate of the steel at 25-50° C. is 90-99.9% less than a substantially similar piece of steel in contact with a substantially similar acidic solution that does not comprise OLE-Ti nano.

In one embodiment, the OLE-Ti nano comprises 0.5-1.2 M $TiCl_4$ immediately following the mixing.

In one embodiment, the OLE-Ti nano comprises 12-20 wt % of the alcohol relative to a total weight of the OLE-Ti nano, and the alcohol is ethanol.

In one embodiment, the OLE-Ti nano comprises 0.5-2.0 wt % of the organic solvent extract of olive leaves immediately following the mixing.

In one embodiment, the organic solvent extract of olive leaves is formed by contacting olive leaves with methanol, ethanol, acetone, 1-propanol or 2-propanol.

In a further embodiment, the olive leaves are dried olive leaves.

In a further embodiment, the contacting is for a period of 12-36 h.

In one embodiment, the steel is an electrode with a corrosion current density of 0.001-0.120 $mA/cm^2$ in the presence of 0.5-2 M inorganic acid at 20-35° C.

In one embodiment, an inhibition efficiency of the OLE-Ti nano is 10-70% greater than an inhibition efficiency of a substantially similar piece of steel in contact with a substantially similar corrosive solution that comprises organic solvent extract of olive leaves but does not contain Ti.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
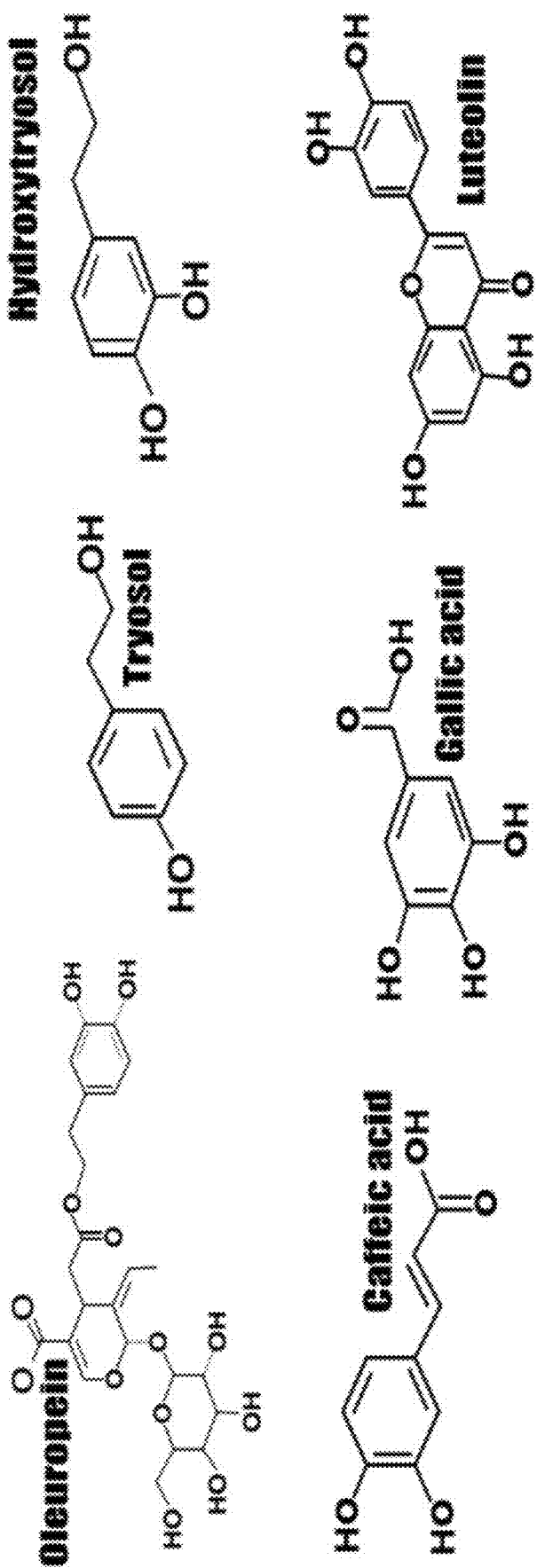
FIG. 1: Some active compounds in olive leaves extract.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of titanium include $^{44}Ti$, $^{46}Ti$, $^{47}Ti$, $^{48}Ti$, $^{49}Ti$, and $^{50}Ti$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term "solution" refers to a composition in a liquid state.

As used herein, "corrosion" refers to the gradual loss of a metal or alloy by its chemical reaction to its environment. For example, corrosion includes the oxidation of iron to form iron oxides. Iron oxide scale (e.g., rust) flaking from the surface of the metal causes a reduction in the mass of the metal object that is made of iron. A "corrosive agent" is a compound that causes corrosion or increases a rate of corrosion when in contact with a metal or alloy. A "corrosive solution," is a solution that comprises a corrosive agent.

As used herein, a "corrosion inhibitor" refers to a compound or composition that when added to a metal or an alloy, or added to a compound in direct contact with a metal or an alloy, decreases the corrosion rate of the material, or prevents corrosion from occurring.

As used herein, the term "organic solvent" refers to and includes, but is not limited to, ethers (e.g. diethyl ether, tetrahydrofuran, 1,4-dioxane, tetrahydropyran, t-butyl methyl ether, cyclopentyl methyl ether, di-iso-propyl ether), glycol ethers (e.g. 1,2-dimethoxyethane, diglyme, triglyme), alcohols (e.g. methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol, 3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol), aromatic solvents (e.g. benzene, o-xylene, m-xylene, p-xylene, mixtures of xylenes, toluene, mesitylene, anisole, 1,2-dimethoxybenzene, α,α,α-trifluoromethylbenzene, fluorobenzene), chlorinated solvents (e.g. chlorobenzene, dichloromethane, 1,2-dichloroethane, 1,1-dichloroethane, chloroform), ester solvents (e.g. ethyl acetate, propyl acetate), amide solvents (e.g. dimethylformamide, dimethylacetamide, N-methyl-2-pyrrolidone), urea solvents, ketones (e.g. acetone, butanone), acetonitrile, propionitrile, butyronitrile, benzonitrile, dimethyl sulfoxide, ethylene carbonate, propylene carbonate, 1,3-dimethyl-3,4,5,6-tetrahydro-2(1H)-pyrimidinone, and mixtures thereof. Additionally, organic solvent may refer to non-polar solvents (e.g. hexane, benzene, toluene, diethyl ether, chloroform, 1,4-dioxane), polar aprotic solvents (e.g. ethyl acetate, tetrahydrofuran, dichloromethane, acetone, acetonitrile, dimethylformamide, dimethyl sulfoxide), polar protic solvents (e.g. acetic acid, n-butanol, isopropanol, n-propanol, ethanol, methanol, formic acid), and mixtures thereof.

As defined herein, "extraction," refers to a separation process where an extracting gas, liquid, and/or supercritical fluid is brought into contact with a composition whereby a compound from the composition becomes homogeneously or heterogeneously dispersed in the extracting gas, liquid, and/or supercritical fluid. Preferably, "extraction" refers to the physical transfer of a compound from the composition and into the extracting gas, liquid, and/or supercritical fluid, and either a portion or all of the compound is transferred. However, in some cases reagents may be used to react with or digest a part of the composition in order to release a compound. For example, a cellulase enzyme may be used to break up a composition comprising a cellulose matrix, in order to release compounds retained within.

As defined herein, an "extract" refers to a compound separated from a composition by an extraction process. An extract may also refer to the mixture of both the extracting gas, liquid, and/or supercritical fluid and the extracted compound. In other cases, an "extract" may refer to only an extracted compound or compounds. Furthermore, an extract may be diluted, concentrated, purified, dried, or reconstituted and still be referred to as an "extract."

As used herein, "olive" refers to the *Olea europaea* plant, which may also use the name of *Oleaeuropaea* or olive tree. Additionally, "leaf" and "leaves" are used interchangeably. Where "leaf" and "leaves" refer to two plant materials having the same mass, the same state (i.e. fresh or dried), and the same species, the plant materials are considered to be chemically and functionally equivalent. For instance, 0.5 g plant material cut and crushed from one fresh leaf of an *Olea europaea* plant is considered to be chemically and functionally equivalent to a total of 0.5 g plant material cut and crushed from more than one fresh leaf from one or more *Olea europaea* plants. Unless otherwise noted, an "olive leaf extract" is considered to be chemically and functionally equivalent to an "olive leaves extract."

According to a first aspect, the present disclosure relates to a method of inhibiting corrosion of steel in contact with a corrosive solution. The method involves mixing an olive leaf extract titanium nanocomposite (OLE-Ti nano) to a concentration of 5-500 ppm, preferably 10-400 ppm, more preferably 40-300 ppm, even more preferably 60-150 ppm, or about 100 ppm in the corrosive solution.

As defined here, steel is an alloy having 55-99.98 wt %, preferably 60-99.96 wt % of elemental iron, and may further comprise carbon, chromium, aluminum, nickel, molybdenum, manganese, vanadium, tungsten, cobalt, titanium, niobium, copper, zirconium, calcium, boron, phosphorus, and/or silicon. "Inhibiting corrosion" means that the treated steel has a reduced rate of corrosion, or no detectable corrosion. "Inhibiting corrosion" also includes preventing corrosion. In one embodiment, OLE-Ti nano may be applied to a surface of steel as a preventative measure when no corrosive agent is present.

The steel may be a part of a building, a bridge, a sign, a sculpture, an intermodal container, a wire, a train car, a railing, a cable, a ship, an automobile, a fire hydrant, a mailbox, a bicycle, a fence, a scaffolding, a pipeline, an oil well, a gas well, a storage tank, a construction equipment, a battery, a chain link, or a piece of furniture. Preferably the steel may be located outdoors, though in some instances the steel may be located indoors, such as an air duct, an exhaust hood, a plumbing, an electrode, or a part of an appliance. Preferably the steel may be prone to rusting or corrosion, such as steel located outdoors or otherwise exposed to humidity, acids, salts, or some other corrosive agent. For testing purposes, the steel may be an electrode, wire, coupon, chad, scrap, or panel with a total surface area of 0.1-1,800 cm$^2$, preferably 0.5-500 cm$^2$, more preferably 0.5-50 cm$^2$ The steel may be one or more types of carbon steel, stainless steel, weathering steel, steel wool, Eglin steel, austenitic steel, ferritic steel, martensitic steel, and/or some other type of steel.

In one embodiment, the steel comprises 0.05-1.0 wt % carbon, preferably 0.07-0.80 wt % carbon, more preferably 0.09-0.60 wt % carbon, even more preferably 0.10-0.20 wt % carbon, or about 0.13 wt % carbon relative to a total weight of the steel. Steel comprising 0.05-2.0 wt % carbon may be referred to as carbon steel, and within that range, steel comprising 0.05-0.25 wt % carbon may be referred to as mild steel. In alternative embodiments, carbon steels comprising 1.0-2.1 wt % carbon may be used. In other alternative embodiments, other metals and metal alloys prone to corrosion may take the place of the steel, such as copper, silver, aluminum, or pure iron. In one embodiment, the steel comprises 98.5-99.2 wt % iron, 0.09-0.18 wt % carbon, 0.10-0.25 wt % Si, 0.30-0.55 wt % Mn, 0.20-0.50 wt % P, 0.01-0.06 wt % S, and 0.015-0.035 wt % Cu, each relative to a total weight of the steel. In one embodiment, the steel comprises 99.1-99.5 wt % iron, 0.4-0.8 wt % manganese, 0.1-0.3 wt % carbon, 0.02-0.06 wt % phosphorus, and 0.001-0.005 wt % Si, each relative to a total weight of the steel.

In one embodiment, the OLE-Ti nano is formed by mixing an organic solvent extract of olive leaves with an alcohol, water, and $TiCl_4$. In the OLE-Ti nano, the $TiCl_4$ may be reduced into Ti which forms a composite with one or more compounds from the organic solvent extract of olive leaves. In some embodiments, one or more compounds of the organic solvent extract of olive leaves may be a reducing agent for the reduction of $TiCl_4$ to Ti.

The olive leaves extract, alcohol, water, and $TiCl_4$ may be mixed for 10 min-36 h, preferably 30 min-24 h, more preferably 0.75-2 h, or about 1 h, at a temperature in a range of 20-50° C., preferably 22-30° C., or about room temperature. The mixing may be performed by agitating or stirring at a speed of 1,000-10,000 rpm, preferably 2,000-5,000 rpm, more preferably about 4,000 rpm. In one embodiment, a homogenization stirrer may be used.

In one embodiment, the OLE-Ti nano immediately following the mixing comprises 0.5-1.2 M $TiCl_4$, preferably 0.6-1.1 M $TiCl_4$, more preferably 0.7-1.0 M $TiCl_4$, or about 0.8 M $TiCl_4$. This concentration may also be considered the initial concentration of $TiCl_4$ before any $TiCl_4$ is reduced.

Alternatively, other forms of titanium may be used instead of or in place of $TiCl_4$. These other forms of titanium include but are not limited to, $TiB_2$, $TiBr_4$, TiC, $Ti(ClO_4)_4$, $TiF_4$, $H_2TiF_6$, $TiH_4$, $TiI_4$, $Ti(NMe_2)_4$, $Ti(NO_3)_4$, $TiO_2$, $H_4TiO_4$, $Ti_4(OCH_2CH_3)_{16}$, $Ti(OCH(CH_3)_2)_4$, $Ti(OCH_2CH_2CH_2CH_3)_4$, $KTiOPO_4$, $NiO.Sb_2O_3.20TiO_2$, $TiS_2$, $TiSe_2$, $TiSi_2$, $TiCl_2$, $TiH_2$, TiO, TiS, $TiSi_2$, $[(C_5H_5)_2Ti(CO)_2]$, TiAl, $TiBr_3$, $TiCl_3$, $TiF_3$, $TiI_3$, TiN, TiP, $Ti_2O_3$, $Ti_2S_3$, $[(C_5H_5)_2TiCl]_2$, $BaTiO_3$, $Ba_2TiO_4$, $Bi_4Ti_3O_{12}$, $CaTiO_3$, $CaCu_3Ti_4O_{12}$, $CaZrTi_2O_7$, $Cs_2TiO_3$, $Dy_2Ti_2O_7$, $EuBaTiO_4$, $FeTiO_3$, $Ho_2Ti_2O_7$, $Li_2TiO_3$, $MnTiO_3$, $Na_2Ti_3O_7$, $Na_{0.5}Bi_{0.5}TiO_3$, $NiTiO_3$, $PbTiO_3$, $Pb(Zr,Ti)O_3$, $SrTiO_3$, $ZnTiO_3$, $[(C_5H_5)_2TiCl_2]$, $[(C_5H_5)_2Ti(CH_3)_2]$, $[(C_5H_5)_2TiS_5]$, $[(C_5H_5)_2Ti(\mu\text{-}Cl)(\mu\text{-}CH_2)Al(CH_3)_2]$, $[(\eta_5\text{-}C_5H_4\text{--}CH_2C_6H_4OCH_3)_2TiCl_2]$, and mixture thereof.

In one embodiment, the OLE-Ti nano comprises 12-20 wt %, preferably 15-19 wt %, more preferably 16-18 wt % alcohol relative to a total weight of the OLE-Ti nano. The alcohol may be methanol, ethanol, n-propanol, i-propanol, n-butanol, i-butanol, t-butanol or mixtures thereof. Preferably the alcohol is ethanol.

The water may be tap water, distilled water, bidistilled water, deionized water, deionized distilled water, reverse osmosis water, and/or some other water. In one embodiment, the water is bidistilled to eliminate trace metals. Preferably the water is bidistilled, deionized, deionized distilled, or reverse osmosis water and at 22-27° C. has a conductivity of less than 10 µS·cm$^{-1}$, preferably less than 1 µS·cm$^{-1}$, a resistivity greater than 0.1 MΩ·cm, preferably greater than 1 MΩ·cm, more preferably greater than 10 MΩ·cm, a total solid concentration less than 5 mg/kg, preferably less than 1 mg/kg, and a total organic carbon concentration less than 1000 μg/L, preferably less than 200 μg/L, more preferably less than 50 μg/L.

In one embodiment, the OLE-Ti nano comprises 0.5-2.0 wt %, preferably 0.7-1.8 wt %, more preferably 0.8-1.5 wt %, even more preferably 0.9-1.2 wt % of the organic solvent extract of olive leaves, relative to a total weight of the OLE-Ti nano, immediately following the mixing. Preferably this weight percentage refers to a dry weight of the organic solvent extract of olive leaves, for instance, the weight of the organic solvent extract having water and solvents removed.

In one embodiment, immediately following the mixing, a weight percentage of the organic solvent extract of olive leaves is in a range of 1-12 wt %, preferably 3-10 wt %, more preferably 4-8 wt %, or about 6.6 wt %, relative to a weight of the $TiCl_4$.

In one embodiment, the organic solvent extract of olive leaves is formed by contacting olive leaves with any of the organic solvents as previously described. The organic solvent extract of olive leaves may also be called an olive leaves extract or an olive leaf extract. Preferably the organic solvent extract is formed by contacting the olive leaves with methanol, ethanol, acetone, 1-propanol, or 2-propanol, preferably ethanol.

Alternatively, the olive leaves may be contacted with water, and/or one or more organic solvents such as methanol, ethanol, acetone, hexane, isopropanol, n-propanol, sec-butanol, n-butanol, isobutanol, tert-butanol, glycerol, diethyl ether, ethylene glycol, propylene glycol, polyethylene glycol, carbon tetrachloride, chloroform, or tetrachloroethylene. The water may be tap water, distilled water, bidistilled water, deionized water, deionized distilled water, reverse osmosis water, and/or some other water as previously mentioned.

Where water and one or more organic solvents are used together as an extraction medium, the extraction medium may comprise 30-99 wt %, preferably 50-90 wt %, more preferably 60-80 wt % water based on the total extraction medium weight. For example, an extraction medium may comprise 75-80 wt % water and 20-25 wt % ethanol. In other embodiments, the extraction medium may comprise 1-70 wt %, preferably 10-50 wt %, more preferably 20-40 wt % of one or more organic solvents relative to the total extraction medium weight. The water and one or more organic solvents may be miscible, partially miscible, or immiscible. Where two organic solvents are used, they may have mass ratios of 10:1-1:10, preferably 5:1-1:5, more preferably 2:1-1:2 with each other. In one embodiment, water may not be used in the extraction medium, however, water may transfer from an olive leaf into the extraction medium.

In one embodiment, a reagent may be added to the olive leaves and organic solvent to improve extraction efficiency, and the reagent may be an acid, base, salt, surfactant, or enzyme. One or more of these reagents may be added until the amount of reagent reaches 0.001-5 wt %, preferably 0.01-2 wt %, more preferably 0.1-1 wt % of the total liquid extracting medium and reagent weight. The acid may be carbonic acid, sulfuric acid, hydrochloric acid, formic acid, citric acid, malic acid, adipic acid, tannic acid, lactic acid, ascorbic acid, acetic acid, fumaric acid, and mixtures thereof. The bases may be sodium hydroxide, lithium hydroxide, potassium hydroxide, sodium carbonate, potassium carbonate, sodium bicarbonate, potassium bicarbonate, magnesium carbonate, calcium carbonate, ammonium hydroxide, substituted amine bases, ammonia, and mixtures thereof. The salt may be sodium chloride, sodium nitrate, potassium chloride, calcium chloride, magnesium chloride, ammonium chloride, sodium bromide, potassium bromide, calcium bromide, magnesium bromide, ammonium bromide, sodium iodide, potassium iodide, calcium iodide, magnesium iodide, ammonium iodide, sodium sulfate, potassium sulfate, calcium sulfate, magnesium sulfate, ammonium sulfate, and mixtures thereof. Surfactants are compounds that lower the surface tension of a liquid, the interfacial tension between two liquids, or between a liquid and a solid. Surfactants may act as detergents, wetting agents, emulsifiers, foaming agents, and dispersants. The surfactant may be cationic, anionic, or nonionic and may include polysorbate 20, polysorbate 40, polysorbate 60, polysorbate 80, Triton X-100, sodium dodecylbenzenesulfonate, cetrimonium bromide, benzalkonium chloride, and sodium lauryl sulfate. An enzyme may be a lipase, glucoamylase, a cellulase, bromelain, an amylase, papain, hemicellulase, phytase, a nuclease, pepsin, trypsin, or some other protease. In one embodiment, enzymes may be used to target the plant cell wall, such as amylase and cellulase.

The olive leaves may be dried, crushed, blended, or cut before the extraction in order to increase the surface area exposed to the extracting medium. As defined here, a dried plant part, such as a dried olive leaf, refers to a plant part having a total water content of 0-7 wt %, preferably 0-6 wt %, more preferably 0-5 wt % of the total weight of the plant part. Preferably, a dried olive leaf is crushed or cut before contacting with the organic solvent. Alternatively, a fresh or dried olive leaf may be mixed with an extracting medium and then crushed, blended, or cut, for example, with an immersion blender. Other mechanical stress may be applied to an olive leaf by freezing, sonication, extrusion, or osmotic shock. In a preferred embodiment, the olive leaves are collected in a fresh state, and then dried in an oven at 38–60° C., preferably 39-50° C. for 12-36 h, preferably 20-30 h. The dried leaves may be crushed or pulverized, and then sieved to select particle sizes less than 2.0 mm, preferably less than 1.5 mm, more preferably less than 1.0 mm.

The organic solvent extract of olive leaves may be made by combining one or more olive leaves, or a portion of an olive leaf, with the organic solvent, where the olive leaf is present at a weight percentage in a range of 0.1-30 wt %, preferably 1-10 wt %, more preferably 2-5 wt %, or about 2.5 wt %, relative to a weight of the organic solvent. The mixture of the organic solvent and olive leaves may be stirred, agitated, or left to sit for 0.25-48 h, preferably 12-40 h, more preferably 20-30 h, at a temperature of 4-125° C., preferably 10-80° C., more preferably 20-30° C.

In some embodiments, the organic solvent and olive leaves may be heated. Preferably the heating may be with a bottom heating element and a loosely covered lid to limit liquid loss by evaporation. The bottom heating element may be a hot plate, coil, induction element, flame, or heating mantle. Alternatively, a convection oven, a microwave oven, a steam manifold, or an autoclave may be used for the heating. For instance, an autoclave may be used to heat the olive leaves and organic solvent to 100-120° C., or higher temperatures such as 130° C. In an alternative embodiment, the olive leaves and medium may be refluxed. After the heating, the solids may be removed from the extraction medium by filtering, centrifugation, or by evaporating and condensing the extract and extraction medium.

In an alternative embodiment, instead of or in addition to an olive leaf extract, an extract from a seed (pit), peel, pulp, husk, juice, flower, nectar, pollen, stem, bark, secretion, or root of the olive plant may be used. In a preferred embodiment, the extract of olive leaves only uses the leaves of the olive plant.

The olive leaf extract may comprise compounds such as oleuropein, tryosol, hydroxytryosol, caffeic acid, gallic acid, and luteolin (FIG. 1). Olive leaf extract may also comprise verbascoside, oleoside, secologanoside, ligstroside, luteolin-4'-O-β-D glucopyranoside, luteolin-7-O-β-D glucopyranoside, apigenin-7-O-glucoside, 10-hydroxyoleuropein, luteolin-7-O-rutinoside, dimethyloleuropein, oleuropein diglucoside, luteolin-7-O-glucoside, rutin, oleuroside, 10-hydroxyligstroside, quercetin, ligstroside, catechin, apigenin, vanillic acid, vanillin, elenolic acid, and other polyphenols and flavonoids. In some embodiments, the olive leave extract may comprise other compounds such as fatty acids, cellulose, lignin, chlorophyll, proteins, carbohydrates, and other compounds typical of plant leaves in general.

In an alternative embodiment, an olive leaf extract may be formed not with a liquid medium but with a gas phase medium or a medium in a supercritical fluid state. Alternatively, the medium may have a mixed state, such as vapor droplets (for example, saturated or wet steam).

In one embodiment, the OLE-Ti nano is in the form of a particle dispersion comprising particles having an average diameter in a range of 50-100 nm, preferably 55-90 nm, more preferably 60-85 nm, even more preferably 65-80 nm, or about 70-74 nm. In a preferred embodiment, the OLE-Ti nano being in the form of a particle dispersion comprises an aqueous solution, however, in other embodiments, the OLE-Ti nano may be a particle dispersion comprising one or more organic solvents as a liquid phase and not containing water.

In one embodiment, the particles may have a spherical shape, or may be shaped like cylinders, boxes, spikes, flakes, plates, ellipsoids, toroids, stars, ribbons, discs, rods, granules, prisms, cones, flakes, platelets, sheets, or some other shape. Preferably the particles have a spherical shape. In one embodiment, the particles may be substantially spherical, meaning that the distance from the particle centroid (center of mass) to anywhere on the nanoparticle outer surface varies by less than 30%, preferably by less than 20%, more preferably by less than 10% of the average distance.

In one embodiment, the particles are monodisperse, having a coefficient of variation or relative standard deviation, expressed as a percentage and defined as the ratio of the particle diameter standard deviation $\sigma$) to the particle diameter mean ($\mu$), multiplied by 100%, of less than 25%, preferably less than 10%, preferably less than 8%, preferably less than 6%, preferably less than 5%. In a preferred embodiment, the particles are monodisperse having a particle diameter distribution ranging from 80% of the average particle diameter to 120% of the average particle diameter, preferably 85-115%, preferably 90-110% of the average particle diameter. In another embodiment, the particles are not monodisperse.

In one embodiment, the particles may be present as agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the particles of the OLE-Ti nano having a mean diameter as previously described.

In a further embodiment, the particles comprise Ti metal and/or Ti particles are separately present in the OLE-Ti nanocomposite. The particles may comprise at least 20 wt %, at least 50 wt %, preferably at least 80 wt % Ti metal relative to a total weight of the particles. In a further embodiment, the Ti metal comprises crystalline Ti metal, for instance, the Ti metal may be at least 80 wt % crystalline Ti, preferably 90 wt %, more preferably at least 95 wt % or about 100 wt % relative to a total weight of the Ti. The crystallinity of the Ti may be determined by observing X-ray diffraction patterns. For instance, crystalline Ti may have diffraction peaks at 27.42°, 36.07°, 41.23°, and 54.30° corresponding to lattice plane value indexed at (101), (104), (200), and (211) planes of face centered cubic (FCC) Ti.

In one embodiment, one or more compounds of the OLE may be adsorbed to an external surface of Ti in the OLE-Ti nano. In other embodiments, one or more compounds of the OLE may be impregnated or adsorbed to an internal surface of the Ti. In other embodiments, one or more compounds may be confined within a porous or solid framework of Ti.

In some embodiments, a corrosion inhibitor (as a particle or compound from the OLE-Ti nano) may adsorb to the surface of the steel by chemisorption and/or physisorption mechanisms, and may follow a Langmuir adsorption isotherm, a Freundlich adsorption isotherm, a Temkin adsorption isotherm, a Brunauer-Emmett-Teller adsorption model, or may not follow any particular adsorption isotherm or model. The chemisorption process occurs when nucleophilic electrons are donated to the surface of the steel, and this interaction is facilitated by the non-bonded electrons and 90-electrons of the corrosion inhibitors, especially those with aromatic and hydrophobic tail moieties. This interaction allows the corrosion inhibitor to form strong electronic bonds with the metallic surface. Physisorption takes place when a corrosion inhibitor adheres to the steel surface and forms a protective film. This interaction may be enhanced by alkyne moieties. The corrosion inhibitor may form an electrically insulating and/or chemically impermeable coating, which suppresses or prevents anodic or cathodic electrochemical reactions on the steel surface. Preferably one or more corrosion inhibitors in the solution act as a mixed corrosion inhibitor, in which both anodic and cathodic reactions on the steel surface are suppressed. In some embodiments, a corrosion inhibitor or other compound may not adsorb to the surface of the steel but to a corrosion inhibitor already adsorbed to the surface of the steel. In one embodiment of the method, the OLE-Ti nano is adsorbed onto a 0.90-0.97 surface area fraction of the steel, preferably 0.91-0.95, more preferably 0.92-0.94, and this adsorption may result from chemisorption and/or physisorption mechanisms. Preferably the OLE-Ti nano is adsorbed by physisorption. As used above, the OLE-Ti nano adsorbing on the surface of the steel means that at least one compound of the OLE-Ti nano adsorbs, and does not require all compounds of the OLE-Ti nano to adsorb.

In one embodiment, the solution may further comprise a corrosion inhibitor intensifier such as potassium iodide, cuprous chloride, a quaternary ammonium compound, an antimony-based compound, and/or a bismuth-based compound. The corrosion inhibitor intensifier may be present in an amount of 0.001-5 wt %, preferably 0.01-3 wt %, more preferably 0.1-1 wt % relative to the total weight of the corrosive solution. Where the solution further comprises two corrosion inhibitor intensifiers, they may have mass ratios of 10:1-1:10, preferably 5:1-1:5, more preferably 2:1-1:2 with each other.

In another embodiment, the solution may further comprise a corrosion inhibitor that is not derived from a plant leaf extract. The corrosion inhibitor may be a surfactant, bis-(2-benzothiazolyl)-disulfide, a dye, an antibiotic, an antihistamine, thiourea, caffeic acid, an amino acid, betanine, a guanidine derivative, a barbiturate, phenyldimethylsulfoniumbromide, an azole derivative, an amine, urea, mercaptobenzothiazole (MBT), benzotriazole, tolyltriazole, an aldehyde, a heterocyclic nitrogen compound, a sulfur-containing compound, an acetylenic compound, ascorbic acid, succinic acid, tryptamine, caffeine, a heterocyclic acid, a phosphosilicate compound (such as that within the HALOX® 750 corrosion inhibitor), or a phenolic acid compound (such as HALOX® RC-980). Where the solution further comprises two corrosion inhibitors that are not from plant leaves, the corrosion inhibitors may have mass ratios of 10:1-1:10, preferably 5:1-1:5, more preferably 2:1-1:2 with each other.

In an alternative embodiment, a compound of the OLE-Ti nano may decrease a rate of corrosion by reacting with and/or neutralizing a corrosive agent, rather than by adsorbing to the surface of the steel.

Generally, corrosive agents are present as aqueous solutions, and may occur naturally through seawater, groundwater, mist, rainfall, and other precipitation. Corrosive agents may also result from air pollution (such as acid rain), water pollution, seepage, or industrial processes, such as metal dust. In one embodiment, the corrosive agent is an aqueous solution comprising a salt or an inorganic acid. In this embodiment, where the corrosive agent is present as an aqueous solution of a salt, the salt may be a chloride salt, a carbonate salt, a bicarbonate salt, and/or a sulfate salt. Additionally, other salts, such as those listed previously for the extraction medium, may be corrosive agents. Where the corrosive agent is present as an aqueous solution comprising an inorganic acid, the inorganic acid may be nitric acid, hydrochloric acid, hydrofluoric acid, sulfuric acid, and/or perchloric acid. Preferably the corrosive agent is hydrochloric acid. Additionally, other organic and inorganic acids, and bases, as listed earlier may be corrosive agents. Corrosive agents may also require other compounds to be present, such as oxygen, in order to corrode a material. An aqueous solution may contain a corrosive agent at low amounts, such as 0.001-1 wt %, preferably 0.01-0.1 wt % of the total aqueous solution weight. Alternatively, an aqueous solution comprising a corrosive agent may be drying or evaporating on the surface of the steel, leading to higher concentrations of the corrosive agent. In this case the corrosive agent may be present at 80-99.9 wt %, or 90-95 wt % of the aqueous solution weight. In other embodiments, the corrosive agent may be present in the aqueous solution at a more moderate weight percentage, such as 1-30 wt %, preferably 2-20 wt %. In one embodiment, the corrosive agent may be present in the corrosive solution at a molar concentration in a range of 0.5-4 M, preferably 0.7-3 M, more preferably 0.9-2 M, or about 1.0 M. The corrosive solution may have a temperature in a range of 30-80° C., or 30-60° C.

The corrosion of a metal or metal alloy, including steel, often occurs through electrochemical oxidation. To test the efficiency of corrosion inhibitors for steel in the presence of a corrosive agent, an electrochemical cell may be constructed using the steel as an electrode. Then, electrochemical parameters such as current density, cathodic and anodic Tafel slopes, charge transfer resistance, and double layer capacitance may be measured by applying different voltages and/or currents. Inhibition efficiency and surface coverage of a corrosion inhibitor may be derived from those measurements. The steel may be treated with a corrosion inhibitor beforehand or may be simultaneously exposed to both a corrosion inhibitor and corrosive agent in the electrochemical cell. A piece of steel may be allowed to equilibrate with a corrosion inhibitor and corrosive agent for 15 min-6 h, preferably 30 min-2 h before taking electrochemical measurements.

In one embodiment of the method, the steel is an electrode with a corrosion current density of 0.001-0.120 mA/cm$^2$, preferably 0.005-0.05 mA/cm$^2$, more preferably 0.01-0.04 mA/cm$^2$, or about 0.034 mA/cm$^2$ with the corrosive solution as the electrolyte solution. Preferably the corrosive solution comprises 0.5-2 M, preferably 0.7-1.5 M, more preferably 0.9-1.1 M inorganic acid at 20-35° C., preferably 22-27° C. In this embodiment, the inorganic acid is the corrosive agent, and may be any of those listed previously, though in a preferred embodiment, the inorganic acid is hydrochloric acid. The corrosion potential may be −520-−490 mV, preferably −500-−485 mV. The steel may have an electrode surface area of 0.5-2 cm$^2$, preferably 0.8-1.2 cm$^2$, or about 1.0 cm$^2$. The steel may form the working electrode in an electrochemical cell that also has a platinum electrode with a surface area of 0.05-0.5 cm$^2$, preferably 0.2-0.4 cm$^2$ as a counter electrode and a saturated calomel electrode as a reference electrode.

In one embodiment, a corrosion rate of the steel is 85-99.9% less than a substantially similar piece of steel in contact with a substantially similar corrosive solution that does not comprise OLE-Ti nano. In one embodiment, the substantially similar corrosive solution that does not comprise OLE-Ti nano does not comprise any other corrosive inhibitors. Additionally, in one embodiment, the corrosion rate may be dependent on weight loss rates due to corrosion. Alternatively, the corrosion rates may be measured by an electrochemical cell and may be dependent on corrosion current densities. The corrosive solution comprises 60-200 ppm, preferably 80-120 ppm, or about 100 ppm of OLE-Ti nano and preferably the two steels have the same shape and size. Preferably both solutions comprise 0.5-2 M, preferably 0.8-1.5 M, more preferably about 1.0 M inorganic acid and are at a temperature in a range of 20-65° C., 25-65° C., or 30-65° C. The corrosion rate, and other effects of corrosion, may involve contacting the steel with the corrosive solution for a time period in a range of 10 min-42 h, preferably 1-24 h, more preferably 2-12 h, or 3-10 h. In other embodiments, the contacting may be 10-60 min, preferably 20-45 min, or about 30 min.

More specifically, in a further embodiment, a corrosion rate of the steel at 50-65° C., preferably 55-62° C., or about 60° C. is 85-90% less, preferably 85.2-87.0% less than a substantially similar piece of steel in contact with a substantially similar acidic solution that does not comprise OLE-Ti nano. In other embodiments, the corrosion rate of the steel may be 65-85% less or 70-80% less.

In a further embodiment, a corrosion rate of the steel at 25-50° C., preferably 27-40° C., or about 30° C., is 90-99.9% less more preferably 92-98% less, even more preferably 93-97% less than a substantially similar piece of steel in contact with a substantially similar acidic solution that does not comprise OLE-Ti nano.

In a further embodiment, the corrosive solution and the substantially similar corrosive solution that does not comprise OLE-Ti nano have a temperature in a range of 20-35° C., preferably 27-32° C., or about 30° C.

In one embodiment, an inhibition efficiency of the OLE-Ti nano is 10-70% greater than an inhibition efficiency of a substantially similar piece of steel in contact with a substantially similar corrosive solution that comprises organic solvent extract of olive leaves but does not contain Ti. Preferably the two solutions comprise the same concentration of olive leaves extract. Where both solutions are at a temperature in a range of 25-45° C., preferably 28-40° C., more preferably 29-35° C., this inhibition efficiency may be 11-40% greater, preferably 12-30% greater. Where both solutions are at a temperature in a range of 45-65° C., preferably 50-63° C., more preferably 52-62° C., this inhibition efficiency may be 40-70% greater, preferably 50-66% greater.

In other embodiments, the method may relate to a way of cleaning steel. This involves the step of contacting a surface of a steel with a corrosive solution comprising 5-500 ppm of OLE-Ti nano, or any concentration of OLE-Ti nano as previously described. Preferably the corrosive solution comprises an acid. The steel may be any of the previously mentioned steels, and preferably the steel may have an impurity on its surface, such as an oxide layer or rust, a stain, residue of an organic substance, a dye, or some other unwanted compound. In one embodiment, the solution may react and dissolve the impurity in order to clean the steel. In another embodiment, the solution may corrode the surface of the steel to the extent that the impurity on the surface is removed, and this process may be known as "pickling." In one embodiment, the steel may be submerged in the solution until the impurity is removed. Alternatively, the solution may be applied and rubbed on the steel until the impurity is visibly removed. Once cleaned, the steel may be rinsed with water and dried. In other embodiments, the method may be adapted to other metals, such as pure iron, silver, aluminum, and copper.

In one embodiment, corrosive solution and OLE-Ti nano may be used for industrial pickling, descaling, or passivation of steel or other metals. Pickling, as mentioned above, involves contacting a metal with a solution in order to remove a thin layer of the surface. A metal may be pickled in order to remove impurities, such as a welding-tinted layers, stains, rust, and scale. Pickling may also remove chromium-depleted layers, which are more prone to corrosion if left untreated. Pickling typically require exposure to a mixture of nitric acid and hydrofluoric acid. Descaling is a process to remove a visibly thick layer of oxide from the metal surface. It may involve submerging the steel in a similar pickling solution and also mill descaling or polishing to mechanically separate the oxide layer. After removing the thick oxide layer, the metal may be pickled as mentioned previously to further remove impurities.

Steel passivation involves the formation of a passive film on the steel surface to protect against corrosion. Passivation may occur naturally, where an oxide layer naturally forms on the surface of steel. In other cases, the formation of an oxide layer may be assisted by acid treatment, such as with a solution of nitric acid, nitric acid with sodium dichromate, or citric acid. As mentioned above, the corrosive solution and OLE-Ti nano be used for steel passivation. In one embodiment, the method of inhibiting corrosion of steel, as mentioned in the first aspect of the disclosure, is essentially equivalent to a method of steel passivation, if compounds of OLE-Ti nano are considered to form a passive layer.

The examples below are intended to further illustrate protocols for preparing, characterizing the olive leaf extract titanium nanocomposite and uses thereof, and are not intended to limit the scope of the claims.

Example 1

Summary of equipment, materials, and methods.
Instruments used for characterization of OLE-Ti nano
Particle sizer Ultra violet-visible (UV-Vis) analysis—JASCO 670 UV/Vis spectrophotometer.
X-ray diffraction (XRD) analysis—Ultima IV X-ray diffractometer. The nanoparticles developed were centrifuged at 6000 rpm for 30 min. The settling solid residues were washed twice with double distilled water and then re-dissolved in absolute ethanol and evaporated to dryness at 80° C. to obtain powdered nanoparticles.
Fourier transform infrared (FTIR) spectroscopy analysis—IR Prestige-21 spectrophotometer (spectral range of 4000 to 400 $cm^{-1}$).

Steel, Electrochemistry, and Surface Study
Mild steel composition (wt. %): C (0.13), Si (0.18), Mn (0.39), P (0.40), S (0.04), Cu (0.025), Fe (balance).
Electrochemical Workstation: Gamry Instrument Potentiostat/Galvanostat/ZRA (Reference 600) with a Gamry framework system based on ESA410.
Scanning Electron Microscope (SEM)-JOEl JSM-5800 LV model.

Experimental Conditions
Concentrations: $2\times10^{-2}$, $4\times10^{-2}$, $6\times10^{-2}$, $8\times10^{-2}$, and $10\times10^{-2}$ (g/L)
Time: 5 h
Temperature: 30, 40, 50, and 60° C.
Corrosive medium: 1 M hydrochloric acid Standard Techniques Adopted for Measuring Corrosion
Weight loss
Potentiodynamic polarization
Electrochemical impedance Example 2

Preparation of Olive Leaves Extract (OLE)
Fresh Olive leaves (*Olea europaea*) were collected from Cyprus International University farm, identified by Botany department of the same university and voucher specimen was deposited. They were washed convincingly in distilled water, dried in oven at 40° C. for 24 h and ground/crushed with electric blender.

The ground OLE powder was sieved in a 0.8 mm particle size Mesh 20 sieve to obtain a homogenous fine powder. Accurately, 10 g of the fine powdered OLE was measured, soaked in 500 mL of ethanol and agitated at a speed of 500 rpm for 24 h. Thereafter, the mixture was filtered and concentrated using rotary evaporator. The concentrate was left in a fume cupboard for 24 h to completely get rid of the solvent. The solid extract was stored in the refrigerator prior to use.

Example 3

Preparation of Olive Leaves Extract Titanium Nanocomposite (OLE-Ti Nano)
The procedures followed were similar to that reported in literature. See Lee H, Chen S C, Kim C, et al. Evaluation of concentration measurement techniques of colloidal nanoparticles for microfiltration and ultrafiltration applications: Inductively coupled plasma-mass spectrometry, nanoparticle tracking analysis and electrospray-scanning mobility particle sizer. Separat Purifi Technol. 2017; 184:34-42. Here, 1 g OLE extract was dissolved in 20 mL ethanol. It was mixed with 80 mL of 1.0 M titanium (IV) chloride in Erlenmeyer flask and stirred with homogenization stirrer at 4,000 rpm for 1 h at room temperature. Color change was observed visually and also with JASCO 670 UV/Vis spectrophotometer. The stock solution was diluted to $2\times10^{-2}$, $4\times10^{-2}$, $6\times10^{-2}$ $8\times10^{-2}$, and $10\times10^{-2}$g (20, 40, 60, 80, and 100 ppm, respectively) with 1 M hydrochloric acid.

Example 4

Characterization of Olive Leaves Extract Titanium Nanocomposite (OLE-Ti Nano)

Particle size of Ti nanoparticles in the composite was determined using a particle sizer. See Lee et al. (2017). JASCO 670 UV/Vis spectrophotometer was used for UV-vis analyses. See Kumar P V, Pammi S V N, Kollu P, et al. Green synthesis and characterization of silver nanoparticles using *Boerhaavia diffusa* plant extract and their anti-bacterial activity. Ind Crops Prodt. 2014; 52:562-566; and Johnson I, Prabu H J. Green synthesis and characterization of silver nanoparticles by leaf extracts of *Cycas circinalis*, *Ficus amplissima*, *Commelina benghalensis* and *Lippia nodiflora*. Int Nano Lett. 2015; 5:43-51.

For X-ray diffraction (XRD) analysis, the nanoparticles developed were centrifuged at 6000 rpm for 30 min. The settling solid residues were washed twice with double distilled water and then re-dissolved in absolute ethanol and evaporated to dryness at 80° C. to obtain powdered nanoparticles. The XRD patterns of the powdered nanoparticles were then recorded using Ultima IV X-ray diffractometer. The FTIR spectrum of the powdered nanoparticles was also scanned within spectral range of 4000 to 400 cm$^{-1}$ using IR Prestige-21 spectrophotometer. Also, the morphology of the nanoparticles was observed using SEM J Quanta FEG 250 model (FEI, Holland).

Example 5

Anticorrosion Studies

Material Preparation

Mild steel (MS) sheets were purchased from pipelines construction materials market in Port Harcourt, Rivers state, Nigeria. They were cut into dimensions 4 cm×4 cm and 1 cm×1 cm for weight loss and electrochemical measurements, respectively. Surface treatment was done according to NACE Recommended Practice RP-0775 and ASTM G-1 & G-4. See Ahmad Z. Principles of corrosion engineering and corrosion control. Oxford: Butterworth-Heinemann; 2006.

Various silicon carbide paper grades were used to abrade the coupons for electrochemical studies, and to mirror finishing using CC-22F P2000 grade, enclosed in sealed waterproof bags and stored in moisture-free desiccator prior to use. The chemical composition (wt. %) of MS was C (0.13), Si (0.18), Mn (0.39), P (0.40), S (0.04), Cu (0.025), Fe (balance).

Corrodent and Inhibitor Concentrations

Analytical grade HCl was diluted to a concentration of 1 M using distilled water. The OLE-Ti nano was used as corrosion inhibitor in the concentrations range of $2\times10^{-2}$-$10\times10^2$ g/L (20-100 ppm).

Example 6

Weight Loss Test

Test specimens for weight loss measurements were cut into 4 cm×4 cm and 1 cm×1 cm dimension. The surfaces of these specimens were treated following the NACE Recommended Practice RP-0775 and ASTM G-1 & G-4. See Ahmad Z. Principles of Corrosion Engineering and Corrosion Control, Butterworth-Heinemann, 2006.

Silicon carbide papers (grade #240 to #800) were used to abrade the specimens to mirror finishing. The abraded specimens were rinsed in running water and acetone to remove possible residue generated by the abrasion process, then dried using specimen dryer at temperature of 40° C., and then stored in moisture-free desiccator prior to use. Weight loss measurements were performed in a glass reaction vessels containing 200 mL of test solution maintained at 25-60° C. in a thermostated water bath for 5 h. The tests were carried out under total immersion in naturally aerated and unstirred conditions in the absence and presence of the inhibitor. Triplicates of the experiments were conducted and the mean values of the weight losses (g) were used for computation of corrosion rate (CR) and inhibition efficiency ($IE_{WL}$) as follows:

$$C_R(mmy^{-1}) = \frac{87.6 \times \Delta W}{\rho A T} \quad (1)$$

$$IE_{WL} = \frac{C_{R(blank)} - C_{R(inh)}}{C_{R(blank)}} \times 100 \quad (2)$$

where $\Delta W$ is the weight loss, $C_{R(blank)}$ and $C_{R(inh)}$ are the corrosion rates (mm/yr) in the absence and presence of OLE-Ti nano, $\rho$ and A depict the density and average surface area (cm$^2$) of the coupon while T is the immersion time (h).

Example 7

Electrochemical Experiments

High performing Gamry Ref 600 ZRA potentiostat/galvanostat was used for this study. The usual three electrode set up was used: reference electrode was saturated calomel electrode (SCE), counter electrode was platinum while working electrode was the respective MS coupons. Selected concentrations ($2\times10^{-2}$, $6\times10^{-2}$, and $10\times10^{-2}$ g/L) of the OLE-Ti nano were tested. The electrochemical impedance spectroscopy (EIS) measurements were conducted at frequency of $10^5$ to $10^{-2}$ Hz after initial open circuit immersion time of 30 min at room temperature which was adequate to establish a steady state OCP. The voltage was maintained at −0.15 to +0.15 V vs. $E_{OCP}$ at scan rate of 1 mV/s for potentiodynamic polarization (PDP) measurements. Data fitting and analyses were done using Echem package. Inhibition efficiency was calculated from values of charge transfer resistances and corrosion current densities from EIS and PDP results according to Equations (3) and (4) respectively:

$$IE_{EIS} = \left(1 - \frac{R_{ct}^0}{R_{ct}}\right) \times 100 \quad (3)$$

where $R_{ct}^0$ and $R_{ct}$ are charge transfer resistances in the absence and presence of inhibitor respectively.

$$IE_{PDP} = \left(1 - \frac{I_{corr}}{I_{corr}^0}\right) \times 100 \quad (4)$$

where $I_{corr}^0$ and $I_{corr}$ are the corrosion current densities in the absence and presence of the inhibitor respectively. See Ituen E B, Akaranta O, Umoren S A. N-acetyl cysteine based corrosion inhibitor formulations for steel protection in 15% HCl solution. J Mol Liq. 2017; 246:112-118.

Example 8

Surface Analysis

The size of the coupons used was 1 cm×2 cm and the surfaces were prepared to mirror finish as earlier described. The morphologies of the mild steel surfaces immersed in the blank (1 M HCl) solution and that containing OLE-Ti nanoparticle composite were analyzed using scanning electron microscope J Quanta FEG 250 model (FEI, Holland) and atomic force microscope Park Systems XE-100 E model (PSIA Corp, Sungnam, Korea).

Example 9

Results and Discussion

Particle Size Distribution and UV-Vis Analysis

Figure 2:
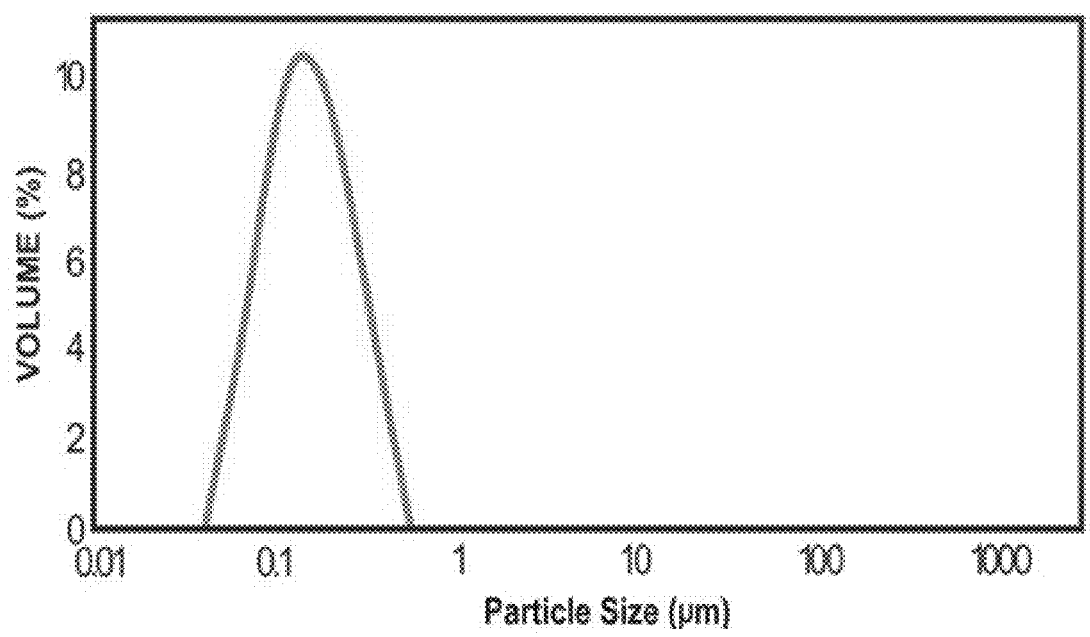
FIG. 2: Particle size distribution pattern of OLE-Ti nano.

The particle size distribution of the synthesized OLE-Ti nano is depicted in FIG. 2. It can be observed that the particles are poly-dispersed in the range of 70-74 nm. The sizes and shapes of OLE-Ti nano could be due to some influences such as time of incubation, pH, reductant concentration, precursor concentration, temperature, as well as method of preparation.

Figure 3:
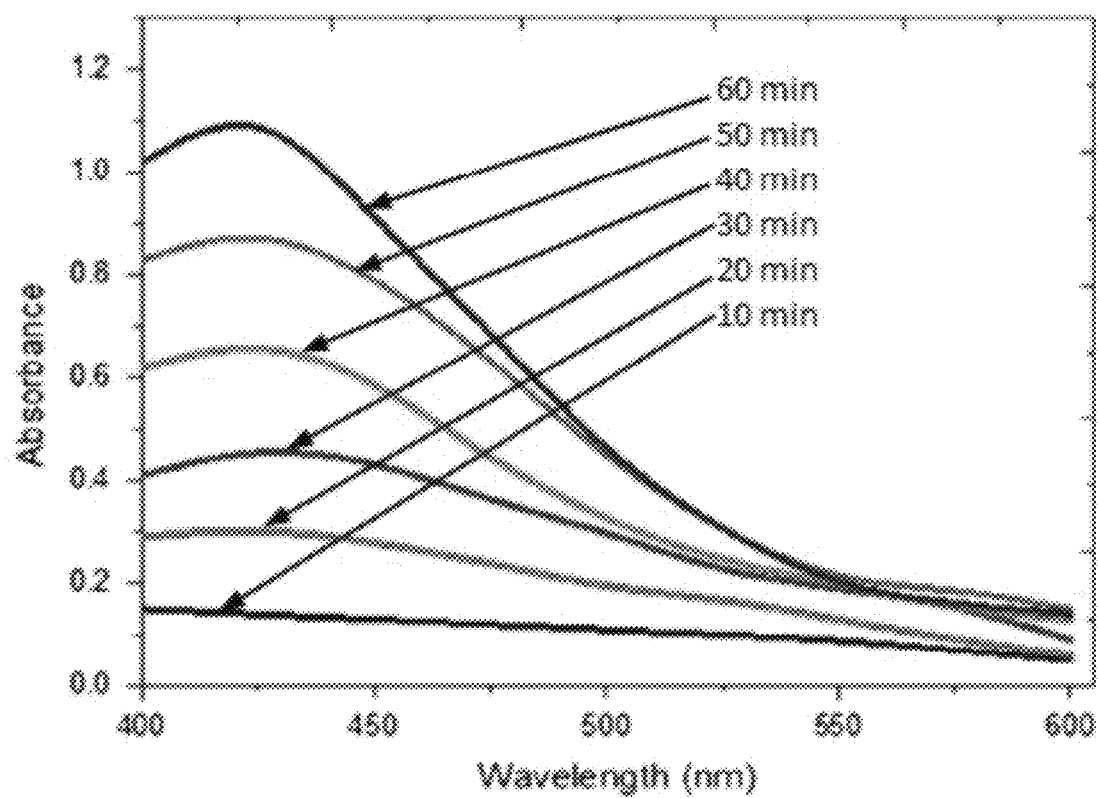
FIG. 3: UV-Vis spectrum of developed OLE-Ti nano at different time intervals.

The absorption spectrum in FIG. 3 shows the UV-vis spectrum recorded for the synthesized OLE-Ti nano. As could be seen, the surface plasmon resonance band appears at about 415-430 nm. It can also be observed that OLE-Ti nano produces a peak at around 420 nm which may be attributed to the spectral absorptions of tannins and flavonoids in the OLE-Ti nano. This inference is consistent with a recent report that OLE is rich in phenolics, tannins and oleuropein. See Goldsmith C D, Vuong Q V, Sadeqzadeh E, et al. Phytochemical properties and antiproliferative activity of *Oleaeuropaea* L. leaf extracts against pancreatic cancer cells. Molecules. 2015; 20:12992-13004. From FIG. 3 it can be concluded that the bio-inspired nanoparticles formation at different time interval was completely formed at 1 h.

XRD Analysis

Figure 4:
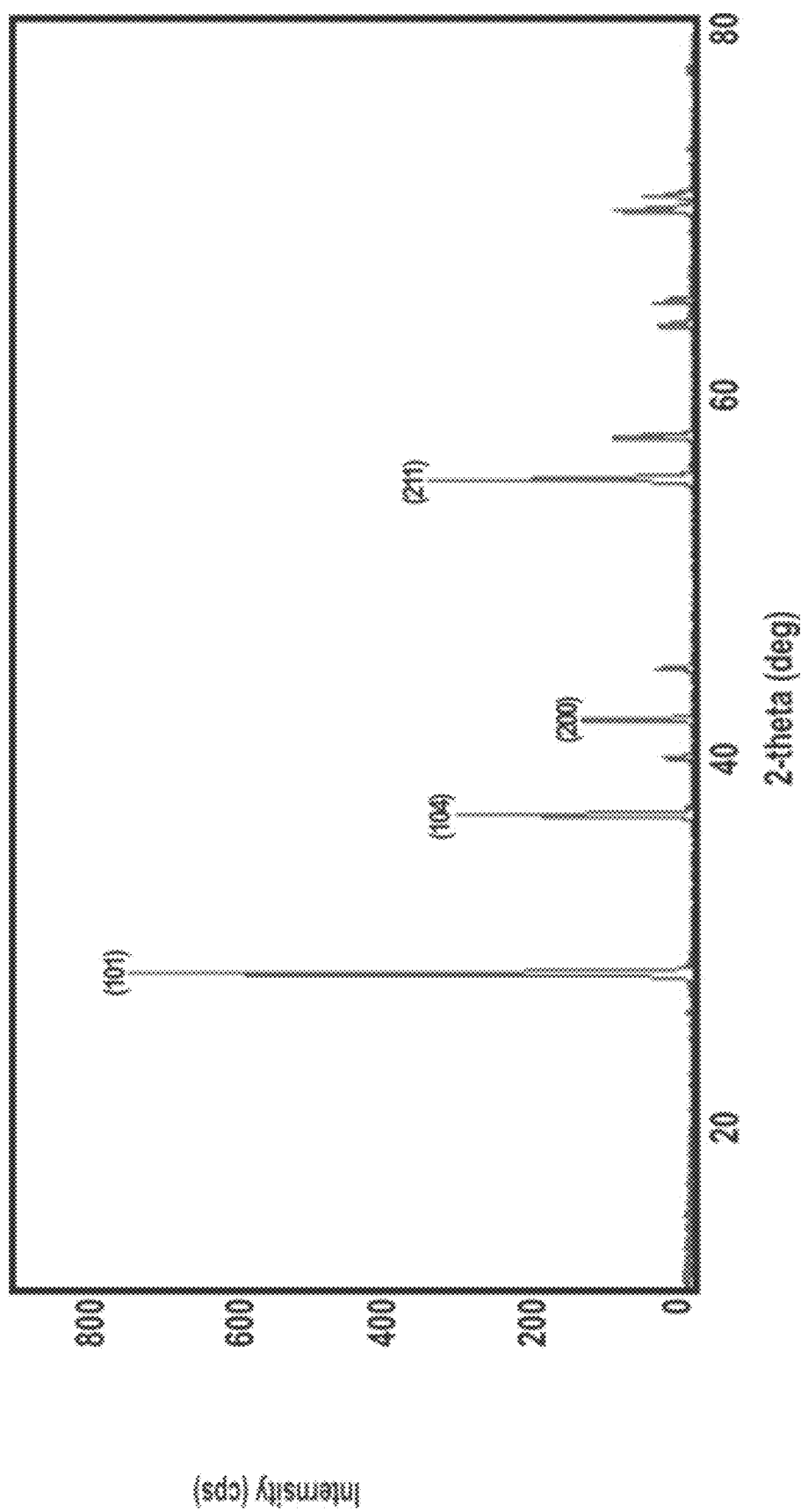
FIG. 4: XRD pattern of OLE-Ti nano.

The XRD profile of OLE-Ti nano was obtained and presented in FIG. 4. The spectrum shows four distinct diffraction peaks at 27.42°, 36.07°, 41.23°, and 54.30° corresponding to lattice plane value indexed at (101), (104), (200) and (211) planes of face centered cubic (FCC). These values agree to good extent with reference of FCC structure from joint committee of powder diffraction standard (JCPDS) Card No-087-0720. See Sundrarajan M, Gown S. Green synthesis of titanium dioxide nanoparticles by *Nyctanthes arbor-tristis* leaves extract. Chalcogenide Lett. 2011; 8:447-451.

FTIR Analysis

Figure 5:
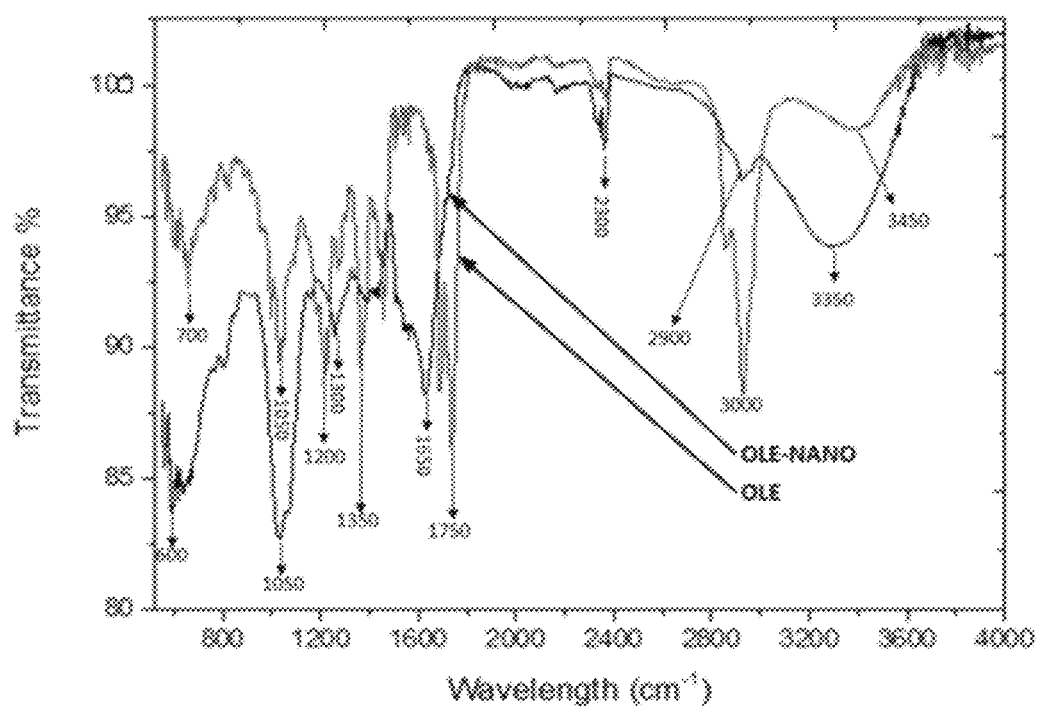
FIG. 5: FTIR pattern of OLE-Ti nano and OLE.

FTIR spectroscopy was used to probe the functionalities of the nanoparticles and the local molecular environment of the capping agents. The obtained spectrum is shown in FIG. 5. Four prominent peaks were observed around 3200-3300, 2900, 1600-1700, and 1050 cm$^{-1}$. The peak around 3200-3300 cm$^{-1}$ is strong and broad and can be assigned to O—H stretching vibrations while the peak around 1600-1700 cm$^{-1}$ can be assigned to C=C stretch or N—H bend or C=O vibrations. See Nabikhan A, Kandasamy K, Raj A, et al. Synthesis of antimicrobial silver nanoparticles by callus and leaf extracts from saltmarsh plant, *Sesuvium portulacastrum* L. Coll Surf B Biointerfaces. 2010; 79:488-493. The peaks around 1050 cm$^{-1}$ can be assigned to C—N stretch. These groups suggest the presence of reducing agent(s), conveying both reduction and stabilization potentials on OLE in the nanoparticles.

Anticorrosion Activity of OLE-Ti Nano—Weight Loss Experiment

Weight loss values were obtained and used to calculate the corrosion rate, inhibition efficiency of MS in 1 M HCl in the absence and presence of OLE-Ti nano at different temperatures. Results obtained are displayed in Table 1. It is clear from the table that OLE-Ti nano inhibited the acid induced corrosion of MS judging from the reduction in corrosion rate in the presence of the OLE-Ti nano in comparison to the blank solution at all range of temperatures studied. Also, corrosion rate is seen to be a function of temperature; increasing as the temperature increases both in the absence and presence of OLE-Ti nano. The decrease in corrosion rate results in an increase in inhibition efficiency on the introduction of OLE-Ti nano into the corrosive medium. The extent of corrosion inhibition by OLE-Ti nano was found to be dependent on its concentration. The inhibition efficiency increased with increase in OLE-Ti nano concentration. This observation could be associated with the availability of the inhibitor in the corrosive medium which ensures enhanced adsorption of the inhibitor molecules on the metal surface. However, when the temperature was raised, the inhibition efficiency decreased. This could be attributed to the desorption of some adsorbed inhibitor molecules on the metal surface as a consequence of increased solution agitation due to higher rate of hydrogen gas evolution. See Sanatkumar B S, Nayak J, Shetty A N. Influence of 2-(4-chlorophenyl)-2-oxoethyl benzoate on the hydrogen evolution and corrosion inhibition of 18 Ni 250 grade weld aged maraging steel in 1.0 M sulfuric acid medium. Int J Hydrogen Energ. 2012; 37: 9431-9442.

Similar reports are available in the literature. See Ituen E, Akaranta O, James A. Evaluation of performance of corrosion inhibitors using adsorption isotherm models: an overview. Chem Sci Int J. 2016; 18:1-34; and James A O, Oforka N C, Abiola O K, et al. A study on the inhibition of mild steel corrosion in hydrochloric acid by pyridoxolhydrochloride. Eclética Química. 2007; 32:31-37. The inhibition of corrosion of MS by OLE-Ti nano can be attributed to the presence of active electron rich species which have been identified from FTIR studies. It has been reported widely that such phytochemicals like tannins and phenolics contain active adsorption sites for interaction with empty orbitals of Fe through adsorption. See Ituen E, Akaranta 0, James A. Electrochemical and anticorrosion properties of 5-hydroxytryptophan on mild steel in a simulated well-acidizing fluid. J Taibah Univ Sci. 2017; 11:788-800.

The corrosion inhibition performance of OLE alone was also determined and compared with that of OLE-Ti nano. The results presented in Table 2 show that OLE-Ti nano performed better than crude OLE at all temperatures. The inhibition efficiency of the highest concentration of the crude OLE at 30° C. for OLE alone was 83.5% while that of the OLE-Ti nano was 94.3%. At the same concentration and with increase in temperature to 60° C., the inhibition efficiency obtained were 51.7 and 85.4% for OLE and OLE-Ti nano respectively. This indicates that the extract inhibits MS corrosion in 1 M HCl better in the presence of Ti nanoparticles than in its crude form, especially at high temperatures. This observation could probably be attributed to the chelating effect of the Ti ions with OLE phyto-constituents which may result in the formation of complexes that covered the steel surface.

TABLE 1

Corrosion rate and inhibition efficiency values deduced from weight loss measurements.

| Concentration | 30° C. | | 40° C. | | 50° C. | | 60° C. | |
|---|---|---|---|---|---|---|---|---|
| | $CR(10^{-4})$ mmpy | $IE_{WL}$ (%) | $CR(10^{-4})$ mmpy | $IE_{WL}$ (%) | $CR(10^{-4})$ mmpy | $IE_{WL}$ (%) | $CR(10^{-4})$ mmpy | $IE_{WL}$ (%) |
| 1M HCl | 1.1897 | — | 3.7643 | — | 8.9703 | — | 14.5521 | — |
| $2 \times 10^{-2}$ g/L | 0.2843 | 76.1 | 0.9335 | 75.2 | 2.5027 | 72.1 | 4.5839 | 68.5 |
| $4 \times 10^{-2}$ g/L | 0.2569 | 78.4 | 0.7491 | 80.1 | 2.0093 | 77.6 | 4.0600 | 72.1 |
| $6 \times 10^{-2}$ g/L | 0.1868 | 84.3 | 0.6324 | 83.2 | 1.7044 | 81.0 | 3.4343 | 76.4 |
| $8 \times 10^{-2}$ g/L | 0.1261 | 89.4 | 0.4291 | 88.6 | 1.3904 | 84.5 | 2.9832 | 79.5 |
| $10 \times 10^{-2}$ g/L | 0.0678 | 94.3 | 0.2447 | 93.5 | 0.8611 | 90.4 | 2.1246 | 85.4 |

CR = Corrosion Rate;
$IE_{WL}$(%) = Percentage Inhibition Efficiency

TABLE 2

Comparisons of inhibition efficiency (%) of $10 \times 10^{-2}$ g/L OLE and $10 \times 10^{-2}$ g/L OLE-Nano at different temperatures.

| Temperature (° C.) | Inhibition efficiency (%) | |
|---|---|---|
| | OLE | OLE-Nano |
| 30 | 83.5 | 94.3 |
| 40 | 76.8 | 93.5 |
| 50 | 59.4 | 90.4 |
| 60 | 51.7 | 85.4 |

Corrosion inhibition of steel by olive leaf extracts reported in the literature in comparison to this present study is summarized in Table 3. Results in the table show that the inhibition efficiency of the olive leaf extract obtained in the present study is comparable with what has been reported in the literature. However, it is noted that the corrosion inhibition performance of olive leaf extract as inhibitor is influenced by temperature, the type of corrosive environments, concentration used, and immersion time. The inhibition efficiency obtained in the present study especially in the presence of Ti nanoparticle composite was comparable with the one reported for J55 steel in $CO_2$-saturated chloride-carbonate solution, but better than that reported for steel in 0.7 M brine solution.

TABLE 3

Comparison of inhibition efficiencies of olive leaves extract for steel reported in the literature with the present study

| S/N | Inhibitor | Medium | Optimum concentration | Temperature and Immersion time | Inhibition efficiency (%) | References |
|---|---|---|---|---|---|---|
| 1 | Olive leaf extract | 2M HCl | 900 ppm | 25° C., 1 day (WL), 1 h (PDP) | $91^a$, $93.4^b$ | See El-Etre AY. 2007 |
| 2 | Olive leaf extract | 0.7M NaCl | 200 ppm | 30° C., 20 h | $34.2^c$ | See Abdel-Gaber et al. 2011 |
| 3 | Olive leaf extract | 1M HCl | $1.4 \times 10^{-5}$ mL/L | 35° C., 6 h (WL), 30 min (PDP, EIS) | $85.1^a$, $89.2^b$, $85.1^c$ | See Bouknana et al. 2015 |
| 4 | Olive leaf extract | $CO_2$—saturated chloride-carbonate solution | 300 mg/L | 35° C., 24 h | $95.8^b$, $94.7^c$ | See Pustaj et al., 2016 |
| 5 | Olive leaf extract (OLE) | 1M HCl | $10 \times 10^{-2}$ g/L | 30° C., 5 h (WL) | $86.6^a$, | [Present study] |
| 6 | OLE-Ti Nano composite | 1M HCl | $10 \times 10^{-2}$ g/L | 30° C., 5 h (WL), 30 min (PDP, EIS) | $94.3^a$, $96.5^b$, $96.3^c$ | [Present study] |

Figure 6A:
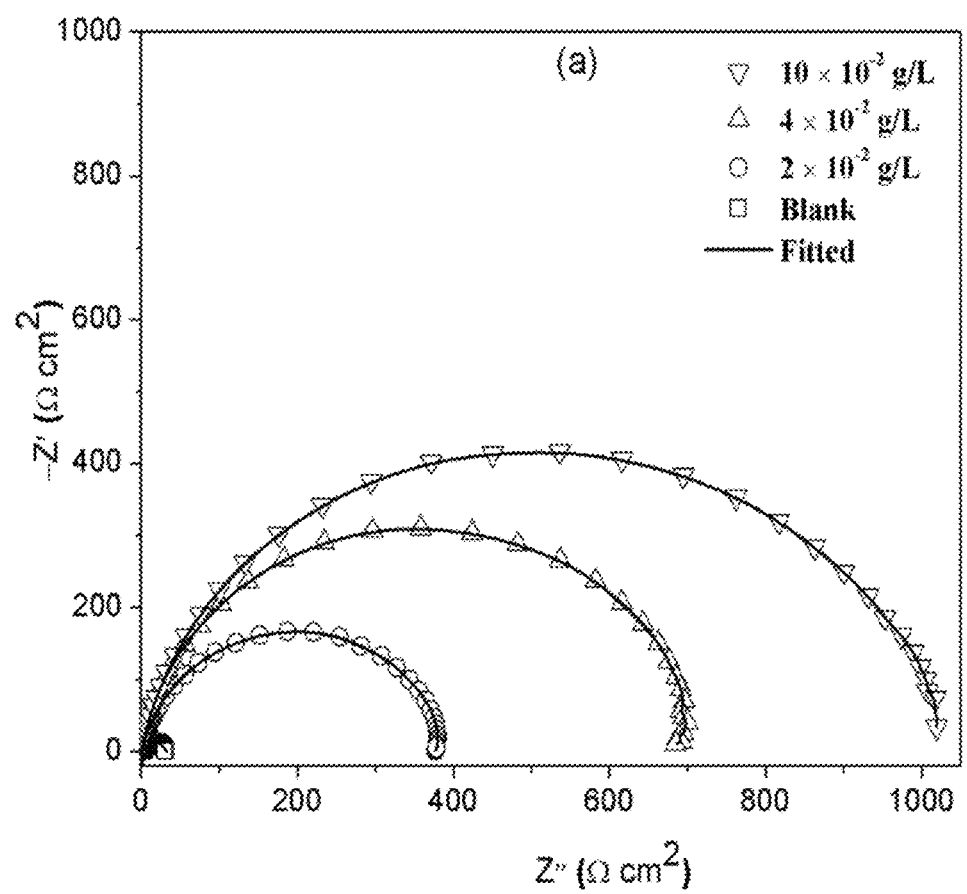
FIG. 6A: Impedance plot for mild steel in 1 M HCl without and with various OLE-Ti nano concentrations in Nyquist format.

$^a$ = results from weight loss (WL) measurements;
$^b$ = PDP measurements;
$^c$ = EIS measurements Anticorrosion Activity of OLE-Ti Nano—EIS Measurements Electrochemical impedance spectroscopy (EIS) measurements were also undertaken in order to gain insight into the kinetics of the electrochemical processes occurring at the 1 M HCl/mild steel interfaces, and how they are influenced by the introduction of OLE-Ti nano into the corrosive medium. Impedance plots for MS in 1 M HCl in the absence and presence of selected concentrations of OLE-Ti nano are depicted in FIG. 6A Nyquist and FIG. 6C Bode representations. The Nyquist plot is characterized by one capacitive loop over the frequency range studied which corresponds to one time constant in the Bode plot. It is observed that the Nyquist semicircles are imperfect but depressed with the centre under the real axis. This is often attributed to the surface heterogeneity, which may be associated with uneven formation of adsorbed layer on metal surface involving the inhibitor for the inhibited system and the corrosion products for the uninhibited system. See Yurt A, Ulutas S, Dal H. Electrochemical and theoretical investigation on the corrosion of aluminium in acidic solution containing some Schiff bases. Appl Surf Sci. 2006; 253:919-925.

Figure 6B:
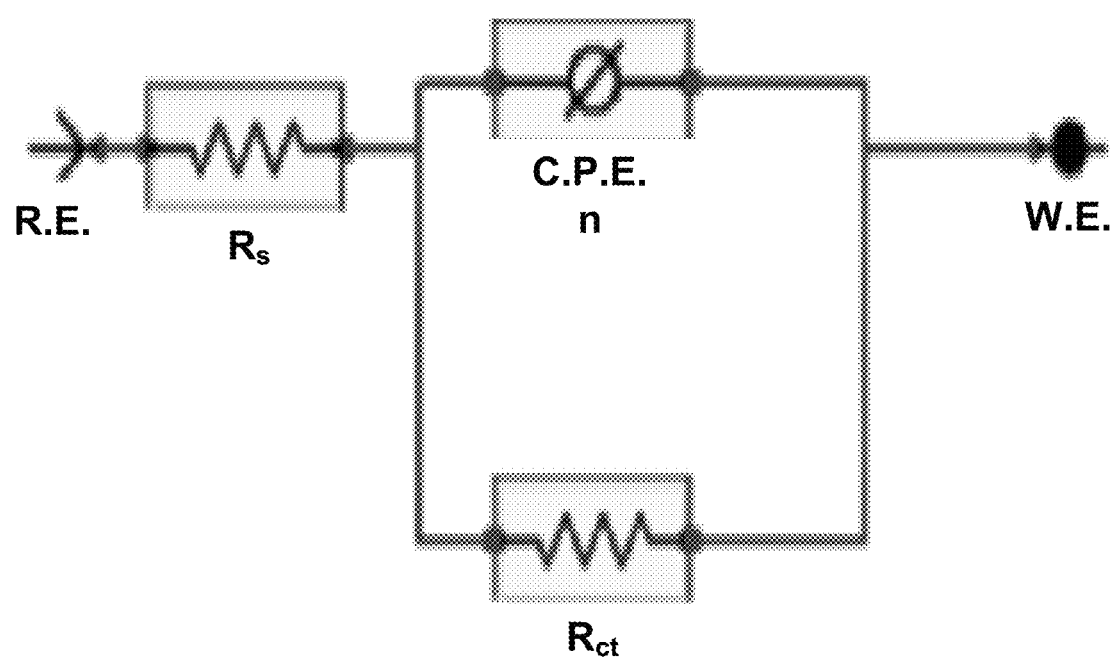
FIG. 6B: Equivalent circuit used to fit experimental data of Nyquist plot.
Figure 6C:
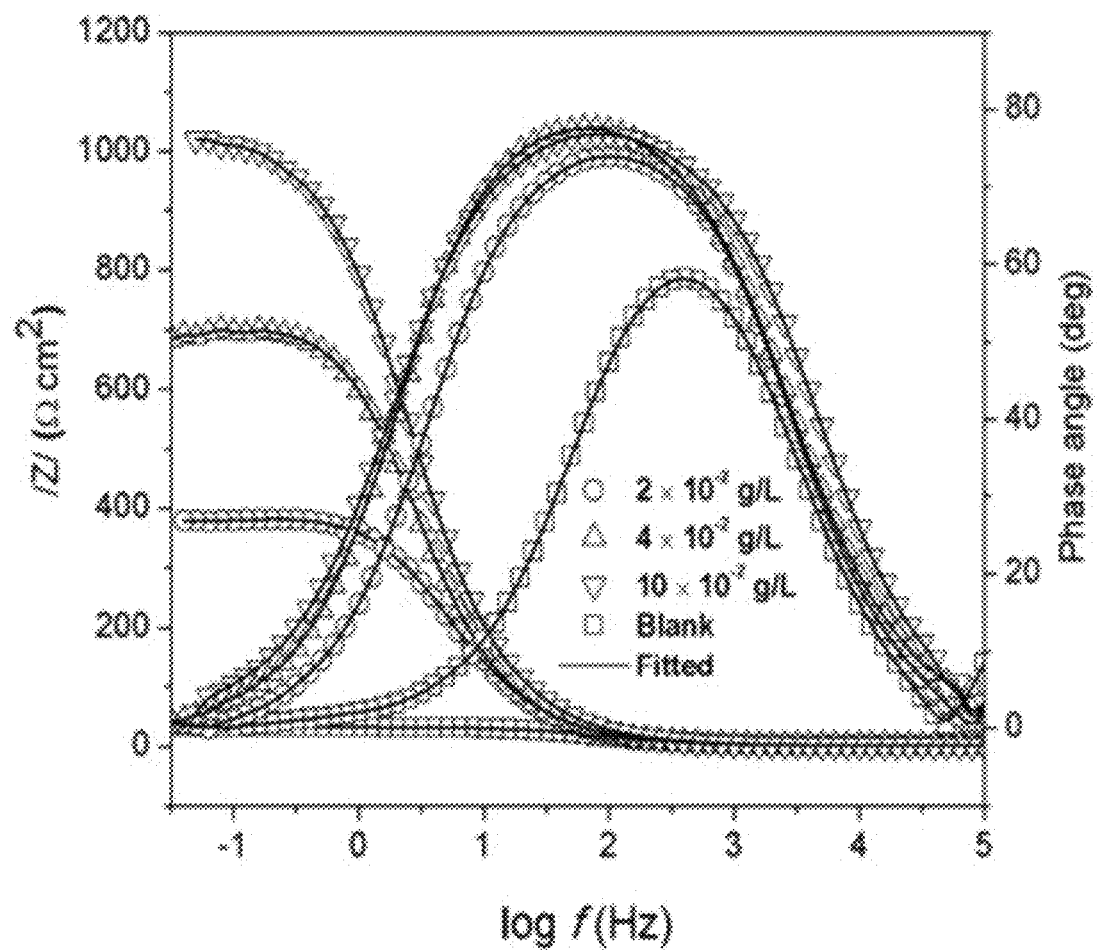
FIG. 6C: Impedance plot for mild steel in 1 M HCl without and with various OLE-Ti nano concentrations in Bode format.

Further inspection of FIGS. 6A and 6C reveals a larger diameter of the capacitive semicircle in the presence of OLE-Ti nano compared to that of the blank HCl; with further enhancement in the diameter of the capacitive loop with increase in OLE-Ti nano concentration. This demonstrates that introduction of OLE-Ti nano into the corrosive medium increased resistivity towards charge transfer at the metal-solution interface and brought about a reduction in the corrosion rate as a result of its inhibitive effect. In other words, the corrosion process may also be considered to be mainly controlled by charge transfer process because of the single capacitive loop obtained from the Nyquist plot. The shapes of the plots are similar without and with the different concentrations of the inhibitors, indicating that OLE-Ti nano addition does not change or affect the corrosion mechanism. See Anupama K K, Ramya K, Shainy K M, et al. Adsorption and electrochemical studies of Pimentadioica leaf extracts as corrosion inhibitor for mild steel in hydrochloric acid. Mater Chem Phys. 2015; 167:28-41.

Inspection of FIG. 6C reveals one time constant (single maximum) at intermediate frequencies. This single maximum is observed to be broadened in the presence of the inhibitor. This could be attributed to the formation of a protective film/layer on the mild steel surface. Furthermore, the impedance value in the presence of OLE-Ti nano is seen to be larger than in its absence (FIG. 6C) and becomes more pronounced with increase in OLE-Ti nano concentration.

The impedance spectra were analyzed by fitting the experimental data to the equivalent circuit shown as FIG. 6B, which is a parallel combination of charge transfer resistance ($R_{ct}$) and the constant phase element (CPE) both are in series with the solution resistance ($R_s$) to obtain electrochemical parameters of interest. The CPE is used instead of ideal capacitor to account for the deviations from ideal dielectric behavior due to the depressed nature of the electrode surfaces. CPE is related to its impedance as follows:

$$Z_{CPE} = Y_0^{-1}(j\omega)^{-n} \quad (5)$$

where $Y_0$ is the CPE constant and n is the CPE exponent; $= (-1)^{1/2}$ which is an imaginary number, and $\omega$ is the angular frequency in rad/s. CPE is reduced to capacitance (C), resistance (R), Warbug impedance, and inductance (L) when n=1, 0, 0.5, and -1 respectively. The magnitude of the double layer capacitance ($C_{dl}$) of the adsorbed film was calculated from constant phase element (CPE) constant ($Y_0$) and charge transfer resistance ($R_{ct}$) using Equation (6):

$$C_{dl} = (Y_o R_{ct}^{n-1}) \quad (6)$$

where n is a constant showing the degree of roughness of the metal surface obtained from the phase angle given that $(j^2=-1)\alpha$ is the phase angle of CPE and $n=2\alpha/(\pi)$. See Ahmad (2006).

Electrochemical impedance parameters generated from the fitting results are listed in Table 4. From Table 4, it is clearly seen that the charge transfer resistance increases with addition of OLE-Ti nano compared to the blank and further exhibits an increasing trend with increasing OLE-Ti nano concentration. The increase in $R_{ct}$ could be attributed to the formation of a protective film at the mild steel/solution interface. It is also clear from the table that inhibition efficiency increased while double layer capacitance ($C_{dl}$) decreased in the presence of OLE-Ti nano compared to the blank. These parameters further increase with respect to IE and decrease with reference to $C_{dl}$ as inhibitor concentration increases. The decrease in $C_{dl}$ values might be attributed to the gradual replacement of water molecules by the adsorption of the inhibitor molecules at the steel/electrolyte interface resulting in an increase in the thickness of electrical double layer and/or a decrease in local dielectric constant. See Lagrene'e M, Mernari B, Bouanis M, et al. Study of the mechanism and inhibiting efficiency of 3,5-bis(4-methylthiophenyl)-4H-1,2,4-triazole on mild steel corrosion in acidic media. Corros Sci. 2002; 44:573-588.

TABLE 4

Some EIS parameters for mild steel corrosion in 1M HCl without and with various OLE-Nano concentrations.

| EIS Parameters | Blank | Concentration (g/L) | | |
|---|---|---|---|---|
| | | $1 \times 10^{-2}$ | $6 \times 10^{-2}$ | $10 \times 10^{-2}$ |
| $R_{ct}$ ($\Omega$ cm$^2$) | 40.3 | 378.2 | 704.6 | 1082.5 |
| $R_s$ ($\Omega$ cm$^2$) | 1.038 | 0.893 | 0.913 | 0.898 |
| $Y_o$ ($\mu\Omega$ s$^n$ cm$^{-2}$) | 157.4 | 181.5 | 145.2 | 136.4 |
| $\chi^2 \times 10^{-6}$ | 782.3 | 987.2 | 634.5 | 443.9 |
| n | 0.8725 | 0.862 | 0.816 | 0.808 |
| $C_{dl}$ ($\mu$F cm$^{-2}$) | 124.8 | 50.16 | 27.4 | 8.6 |
| IE$_{EIS}$ (%) | — | 89.3 | 94.2 | 96.3 |

Anticorrosion Activity of OLE-Ti Nano—PDP Measurements

Corrosion of steel in HCl at the electrodes may involve either a reduction or oxidation half reaction, or both. Reduction which occurs at the cathode involves liberation of hydrogen gas (Equation 7a). Also, oxygen reduction is a very common cathodic reaction, since oxygen is present in the atmosphere and in solutions exposed to the atmosphere (Equation 7b). Oxidation involves corrosion of the iron to the higher oxidation state as shown in Equations (8):

Cathode: $2H_{(aq)}^+ + 2e \rightarrow H_{2(g)}$ \quad (7a)

$O_2 + 4H^+ + 4e^- \rightarrow 2H_2O$ \quad (7b)

Anode: $Fe_{(g)} \rightarrow Fe_{(aq)}^{2+} + 2e$ \quad (8)

See Ituen et al. (2016).

Figure 7:
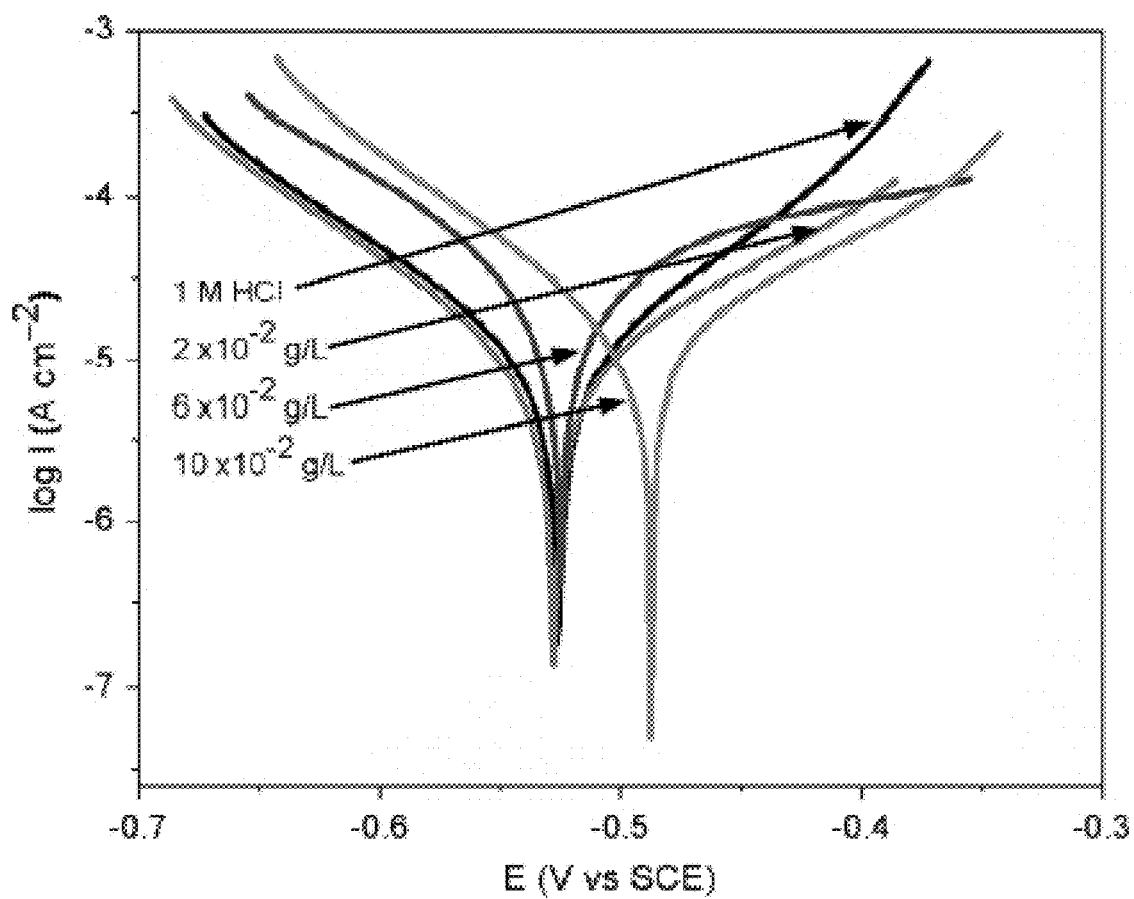
FIG. 7: Tafel plot for mild steel in 1 M HCl without and with various OLE-Ti nano concentration.

Potentiodynamic polarization measurements were therefore carried out to assess the influence of the additive on the kinetics of the anodic and cathodic reactions. The potentiodynamic polarization (PDP) curves for mild steel (MS) in 1 M HCl without and with selected concentrations of OLE-Ti nano at 30° C. are depicted in FIG. 7. Examination of the curves shown in FIG. 7 reveal that the MS specimen undergo active dissolution within the range of potential investigated without inclination towards passivation both in the absence and presence of the inhibitor. It is clear from the curves that $E_{corr}$ shifts toward a positive direction in the presence of inhibitor which is more pronounced with increase in the inhibitor concentration. It is also seen that polarization curves shift to the region of lower current density in the presence of the inhibitor compared to the blank. This is an indication that OLE-Ti nano caused a reduction in corrosion current density and therefore a reduction in the corrosion rate of mild steel in 1 M HCl. The free corrosion potential ($E_{corr}$) and the corresponding corrosion current density ($I_{corr}$) were estimated from Tafel extrapolation method and listed in Table 5. Also, Tafel slope constants for cathode ($\beta_c$) and anode ($\beta_a$) deduced from the plots (slopes) are presented in Table 5. Results show that the ($I_{corr}$) values decrease on addition of inhibitor due to formation of adsorbed protective film of inhibitor. The shift in $E_{corr}$ values towards the positive direction in (FIG. 7) OLE-Ti nano inhibited solutions compared to 1 M HCl solution although less than −85 mV indicates that OLE-Ti nano act as mixed type inhibitor with predominant control of anodic reaction. See Ituen et al. (2016) and Solomon et al. (2017). The values of $\beta_a$ obtained changes with concentration of OLE-Ti nano but shows no definite trend. However, the values of $\beta_c$ follow no precise trend inferring cathodic reactions modification by the inhibitor. The values of inhibition efficiency from the PDP measurements computed using Equation (4) are also listed in Table 5. It is clear from the table that IE increased with increase in OLE-Ti nano concentration reaching the value of 96.5% at the advantageous concentration ($10\times10^{-2}$ g/L) studied. This result is in good agreement with the values obtained from weight loss and EIS measurements.

TABLE 5

Some PDP parameters for mild steel corrosion in 1M HCl without and with selected concentrations of OLE-Nano at 30° C.

| PDP parameters | Blank | Concentration (g/L) | | |
|---|---|---|---|---|
| | | $2 \times 10^{-2}$ | $6 \times 10^{-2}$ | $10 \times 10^{-2}$ |
| $\beta_a$(mV/decade) | 95.2 | 64.4 | 61.62 | 70.3 |
| $\beta_c$(mV/decade) | 65.5 | 88.4 | 95.3 | 98.7 |
| $I_{corr}$(μA cm$^{-2}$) | 969.3 | 121.2 | 58.6 | 33.6 |
| $E_{corr}$ (mV/SCE) | −525 | −527 | −522 | −483 |
| $IE_{PDP}$ (%) | — | 87.5 | 93.9 | 96.5 |

Adsorption Isotherm

Corrosion inhibitors may function by adsorption on the metal surface thereby blocking the active sites. The adsorption may take place as action of chemical or physical forces. In order to explain the nature of adsorption of OLE-Ti nano on MS, the coverage data (θ) derived from the simple expression of θ=0.01×IE (assuming a direct relationship between surface coverage and inhibition efficiency) from the weight loss data at different temperatures, were fitted into some adsorption isotherms such as Langmuir, El-Awady et al., Temkin, and Freundlich as described by Solomon and coworkers. See Ituen (2017).

Figure 8:
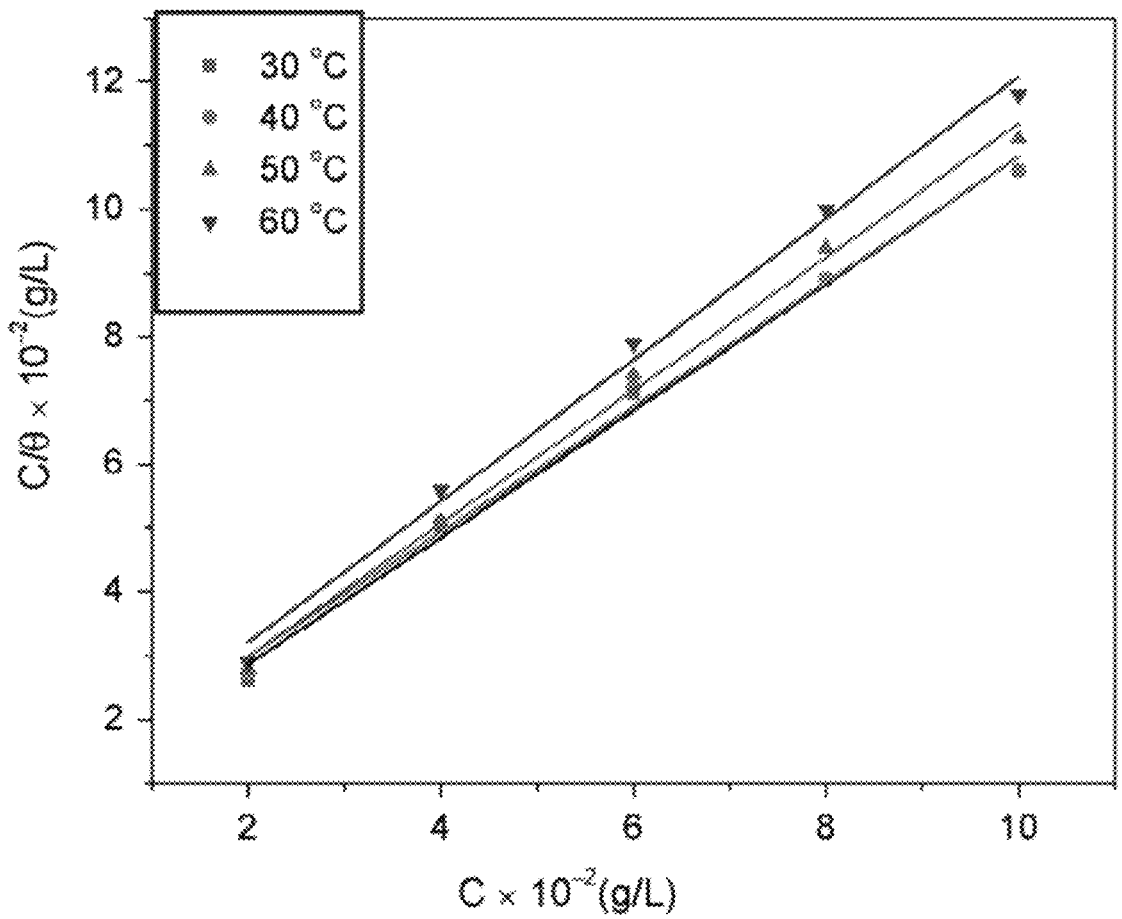
FIG. 8: Langmuir adsorption isotherm for adsorption of OLE-Ti nano.

OLE-Ti nano adsorption fitted into Langmuir adsorption model (FIG. 8). According to this model, the fractional surface coverage of OLE-Ti nano (74) is related to its concentration according to Equation (9).

$$\frac{C_{inh}}{\theta} = \frac{1}{K_{ads}} + C_{inh} \quad (9)$$

where $C_{inh}$ is the OLE-Ti nano concentration (g/L) and $K_{ads}$ is the equilibrium constant of the adsorption—desorption process, connected to free energy change of adsorption as shown in Equation (10):

$$\Delta G_{ads}^{\circ} = -RT \ln(1000 \times K_{ads}) \quad (10)$$

where R is the universal constant, T is the absolute temperature, and $1\times10^3$ is the concentration of water molecules expressed in g L$^{-1}$. FIG. 8 shows fitting of experimental data points of the plot of C/θ against C and correlation coefficient ($R^2$) value of the order of 0.99 with slope in the vicinity of unity confirming the suitability of Langmuir adsorption isotherm model. The adsorption parameters derived from this model are displayed in Table 6. The values of free energy of adsorption ($\Delta G_{ads}$) obtained are all negative and in the range of −17.75 to −19.18 kJ/mol. The absolute values of $\Delta G_{ads}^{\circ}$ are usually used to brand adsorption mechanism as physisorption, chemisorption, or a combination of both adsorption modes. Physisorption is associated with electrostatic interactions between charged inhibitor molecules and charged metal surface, while chemisorption involves charge sharing between inhibitor molecules and the metal resulting in a coordinate type of bond. A value of $\Delta G_{ads}^{\circ}$ around −20 kJ/mol or of lower magnitude is suggestive of physisorption mechanism; while a value around −40 kJ/mol or of larger magnitude denotes a chemical adsorption. The values of $\Delta G_{ads}^{\circ}$ obtained in this study (Table 6) are less negative than −20 kJ/mol, which suggests that the adsorption of OLE-Ti nano on mild steel in 1 M HCl follows physisorption mechanism. See Ituen (2017).

TABLE 6

Adsorption parameters deduced from the Langmuir adsorption isotherm plot

| T (° C.) | $\Delta G_{ads}$(kJmol$^{-1}$) | $K_{ads}$ (L g$^{-1}$) | Slope | $R^2$ |
|---|---|---|---|---|
| 30 | −17.75 | 1.15 | 0.99 | 0.993 |
| 40 | −17.92 | 0.98 | 0.99 | 0.992 |
| 50 | −18.85 | 1.12 | 1.04 | 0.995 |
| 60 | −19.18 | 1.02 | 1.11 | 0.992 |

The standard enthalpy ($\Delta H_{ads}^{\circ}$) and entropy ($\Delta S_{ads}^{\circ}$) changes for the adsorption of OLE-Ti nano on mild steel surface were obtained from the basic thermodynamic equation:

$$\Delta G_{ads}^{\circ} = \Delta H_{ads}^{\circ} - T\Delta S_{ads}^{\circ} \quad (11)$$

where $\Delta G_{ads}^{\circ}$ and T retain their usual meanings. See Prabhu R A, Shanbhag A V, Venkatesha T V. Influence of tramadol [2-[(dimethylamino) methyl]-1-(3-methoxyphenyl) cyclohexanol hydrate] on corrosion inhibition of mild steel in acidic media. J Appl Electrochem. 2007; 37:491-497.

Figure 9:
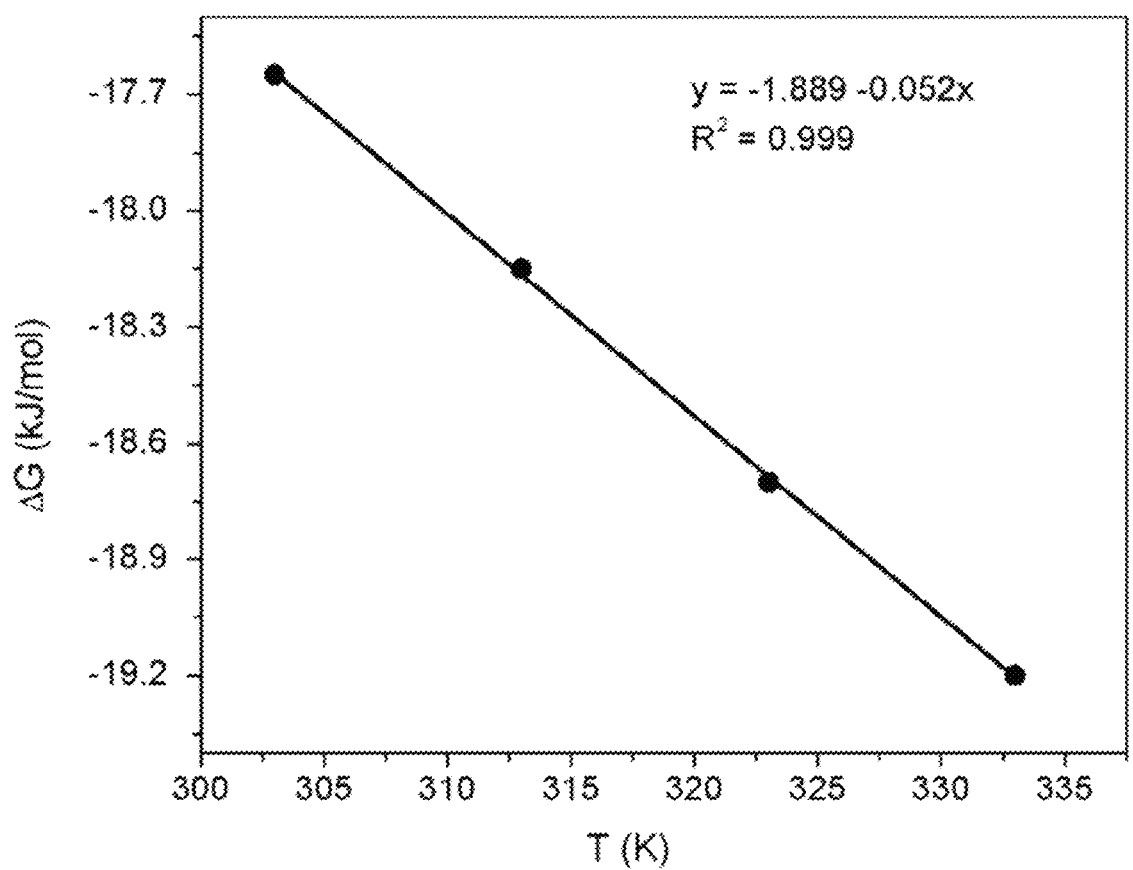
FIG. 9: Plot of $\Delta G_{ads}^0$ vs T for the adsorption of OLE-Nano on mild steel in 1 M HCl.

A plot of $\Delta G_{ads}^{\circ}$ vs T is shown to be linear in FIG. 9 from which the $\Delta_{ads}^{\circ}$ and $\Delta H_{ads}^{\circ}$ were obtained from the slope and intercept of the linear plot, respectively. The values of enthalpy of adsorption ($\Delta H_{ads}^{\circ}$) and entropy of adsorption ($\Delta S_{ads}^{\circ}$) obtained were −1.89 and −52 J/mol/K. From the result obtained, it is seen that the value of enthalpy of adsorption ($\Delta H_{ads}^{\circ}$) is negative, which suggests that the adsorption of OLE-Ti nano is an exothermic process. It has been reported in the literature that exothermic adsorption process characterized either physisorption or chemisorption while endothermic adsorption characterized exclusively chemisorption phenomenon. See Sanatkumar et al. (2012); and Yadav M, Sinha R R, Kumar S, et al. Corrosion inhibition effect of spiropyrimidinethiones of mild steel in 15% HCl solution: Insight from electrochemical and quantum studies. RSC Adv. 2015; 5:70832-70848.

On the basis of absolute numerical values, physisorption manifests when $\Delta H_{ads}^0$ is less negative than 40 kJ/mol, while for chemisorption, the value approaches –100 kJ/mol. See Singh A K, Quraishi M A. Effect of cefazolin on the corrosion of mild steel in HCl solution. Corros Sci. 2010; 52:152-160.

The value of $\Delta H_{ads}^0$ obtained in the present study is –1.89 kJ/mol, which indicates that the adsorption of OLE-Ti nano on mild steel involves physisorption mechanism. The negative value of $\Delta S_{ads}^0$ suggests that OLE-Ti nano was orderly adsorbed on the mild steel surface resulting in a decrease in entropy. This is consistent with basic thermodynamic principles that exothermic adsorption process must be accompanied by a decrease in entropy.

Kinetic and Thermodynamic Studies

Figure 10:
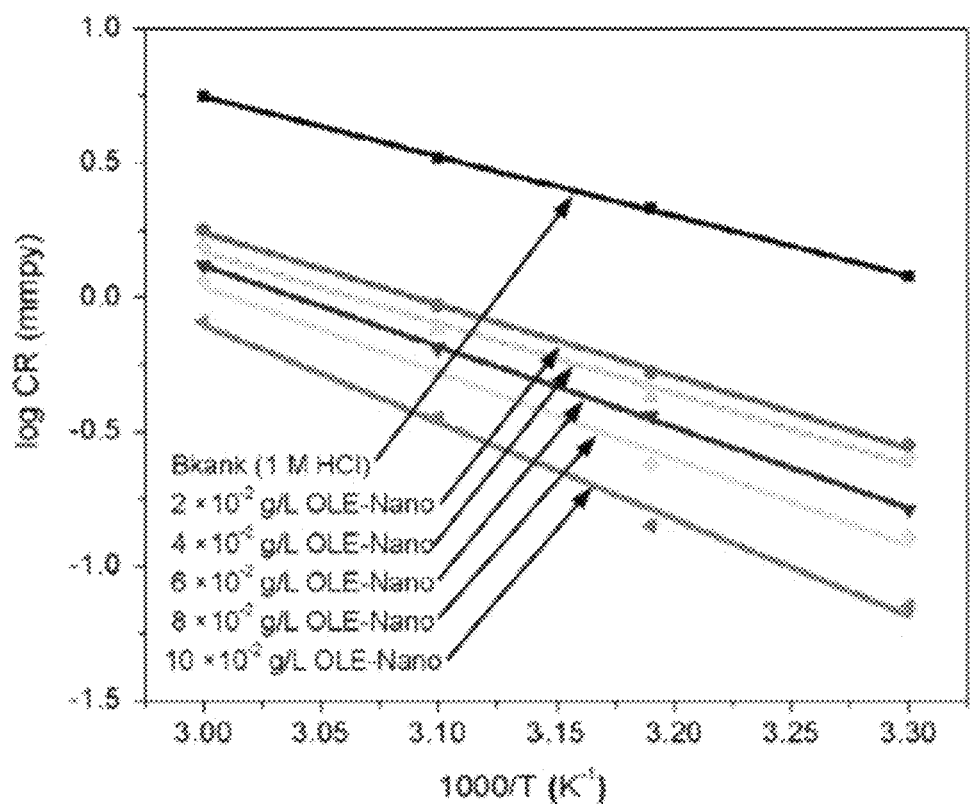
FIG. 10: Arrhenius plot for inhibition of mild steel corrosion in 1 M HCl without and with different concentrations of OLE-Ti nano.
Figure 11:
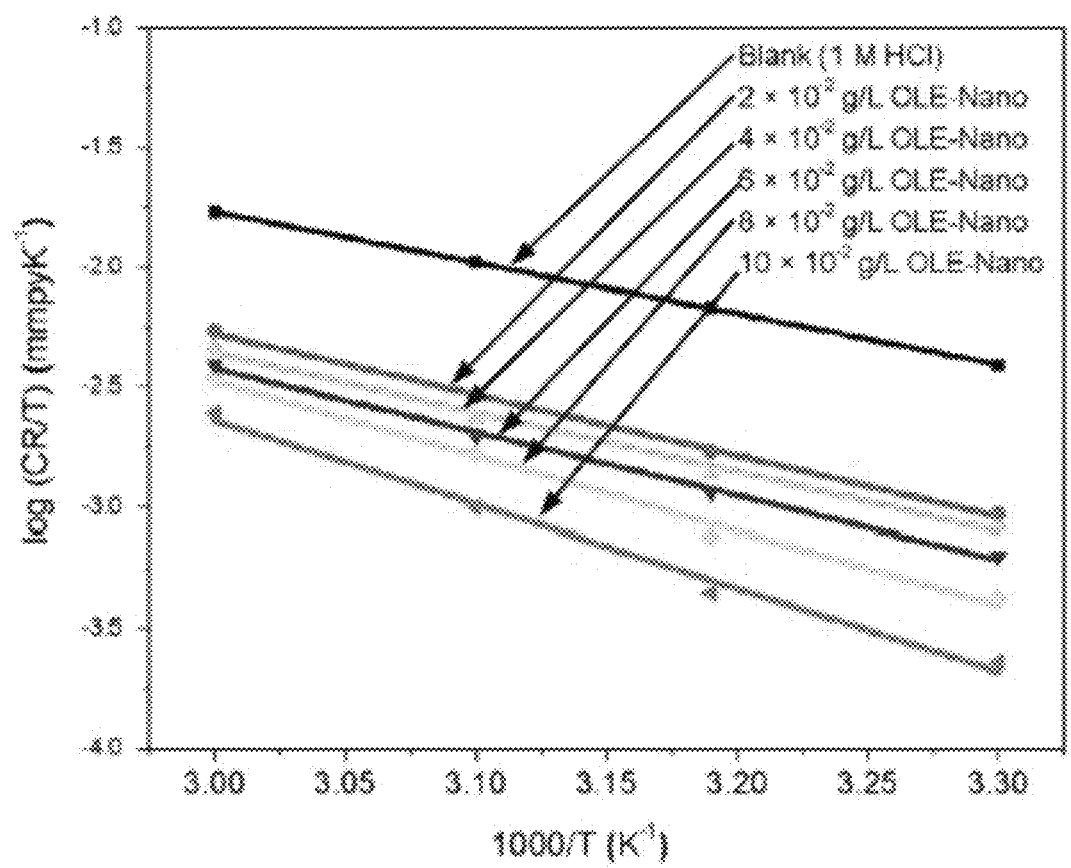
FIG. 11: Transition state plot for mild steel corrosion in 1 M HCl without and with various OLE-Ti nano concentrations.

The kinetic and thermodynamics parameters for the corrosion of MS in 1 M HCl in the absence and presence of OLE-Ti nano were evaluated using the dependence of corrosion rate on temperature by making use of the Arrhenius equations (Equations 12 and 13):

$$\log CR = \log A - \left(\frac{E_a}{2.303RT}\right) \quad (12)$$

$$\log\left(\frac{CR}{T}\right) = \left[\left(\log\left(\frac{R}{Nh}\right) + \left(\frac{\Delta S^*}{2.303R}\right)\right)\right] - \frac{\Delta H^*}{2.303RT} \quad (13)$$

where $E_a$ denotes activation energy, A denotes Arrhenius frequency factor, R is the universal gas constant, and T is absolute temperature, $\Delta H^*$ is the enthalpy of activation and $\Delta S^*$ is the entropy of activation. $E_a$ values were evaluated from the slope of plot of log CR vs. 1/T shown to be linear in FIG. 10. $\Delta H^*$ and $\Delta S^*$, on the other hand were obtained from the slope and intercept respectively of the plot of log (CR/T) vs. 1/T presented in FIG. 11. In general, physisorption of the inhibitor molecules is predicted when the computed $E_a$ and $\Delta H^*$ for inhibited system is observed to increase from those computed for uninhibited system while the opposite holds for chemisorption mechanism. From Table 7, it is seen that $E_a$ and $\Delta H^*$ values in the presence of OLE-Ti nano are higher than that of the blank supporting the inference drawn from adsorption parameters that physical adsorption prevails over chemical adsorption of OLE-Ti nano onto the MS surface. Activation energy deduced increases with inhibitor loading in a concentration-dependent manner compared to the free acid solution. Similar results have been reported in literature. This trend has been explained in terms of the collision theory. Principally, activation energy is the minimum energy with which a reactant molecule will collide to convert to products. From our results, this energy is higher in the presence of OLE-Ti nano than blank acid solution. The presence of inhibitor appears to increase the energy barrier required for acid molecules to corrode the steel, which could lead to corrosion inhibition.

TABLE 7

Activation parameters for mild steel in 1M HCl in the absence and presence of different concentrations of OLE-Nano.

| Concentration (g/L) | $E_a$ (kJ mol$^{-1}$) | $\Delta H^*$ (kJ mol$^{-1}$) | $\Delta S^*$ (J mol$^{-1}$ K$^{-1}$) | $R^2$ (Arrhenius) | $R^2$ (Transition state) |
|---|---|---|---|---|---|
| Blank | 42.57 | 40.82 | –108.97 | 0.999 | 0.999 |
| $2 \times 10^{-2}$ | 50.53 | 47.26 | –100.96 | 0.998 | 0.999 |
| $4 \times 10^{-2}$ | 51.19 | 48.51 | –95.69 | 0.982 | 0.984 |
| $6 \times 10^{-2}$ | 57.68 | 50.42 | –92.74 | 0.999 | 0.996 |
| $8 \times 10^{-2}$ | 61.49 | 59.16 | –67.53 | 0.988 | 0.985 |
| $10 \times 10^{-2}$ | 68.99 | 66.32 | –49.13 | 0.987 | 0.987 |

The values of $\Delta S^*$ are negative both in the absence of presence of the inhibitor. The negative value of entropy of activation for the uninhibited system has been reported in the literature to be associated with mechanism of hydrogen evolution reaction. See Zhang Q B, Hua Y X. Corrosion inhibition of mild steel by alkylimidazolium ionic liquids in hydrochloric acid. Electrochim Acta. 2009; 54:1881-1887. The activation entropy is seen to be negative in the presence of OLE-Ti nano and increased as the concentration of OLE-Ti nano increases (Table 7). The negative value of $\Delta S^*$ in the presence of OLE-Ti nano suggests that the activated complex in the rate determining step represents an association rather than dissociation step, meaning that during the adsorption process, a decrease in the degree of disorderliness takes place on moving from reactants to the activated complex.

Surface Morphological Examination

Figure 12A:
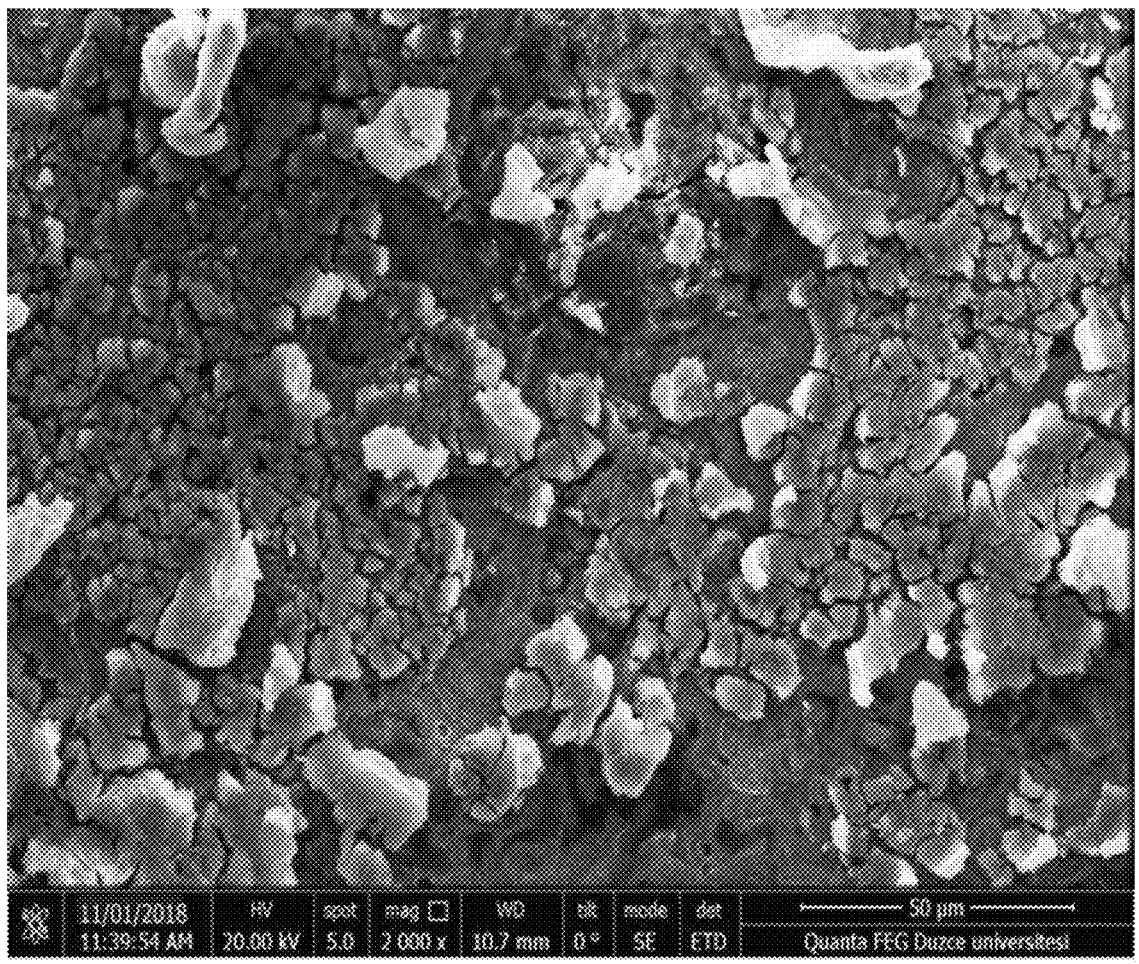
FIG. 12A: SEM micrograph of mild steel surface in 1 M HCl in the absence of OLE-Ti nano.
Figure 12B:
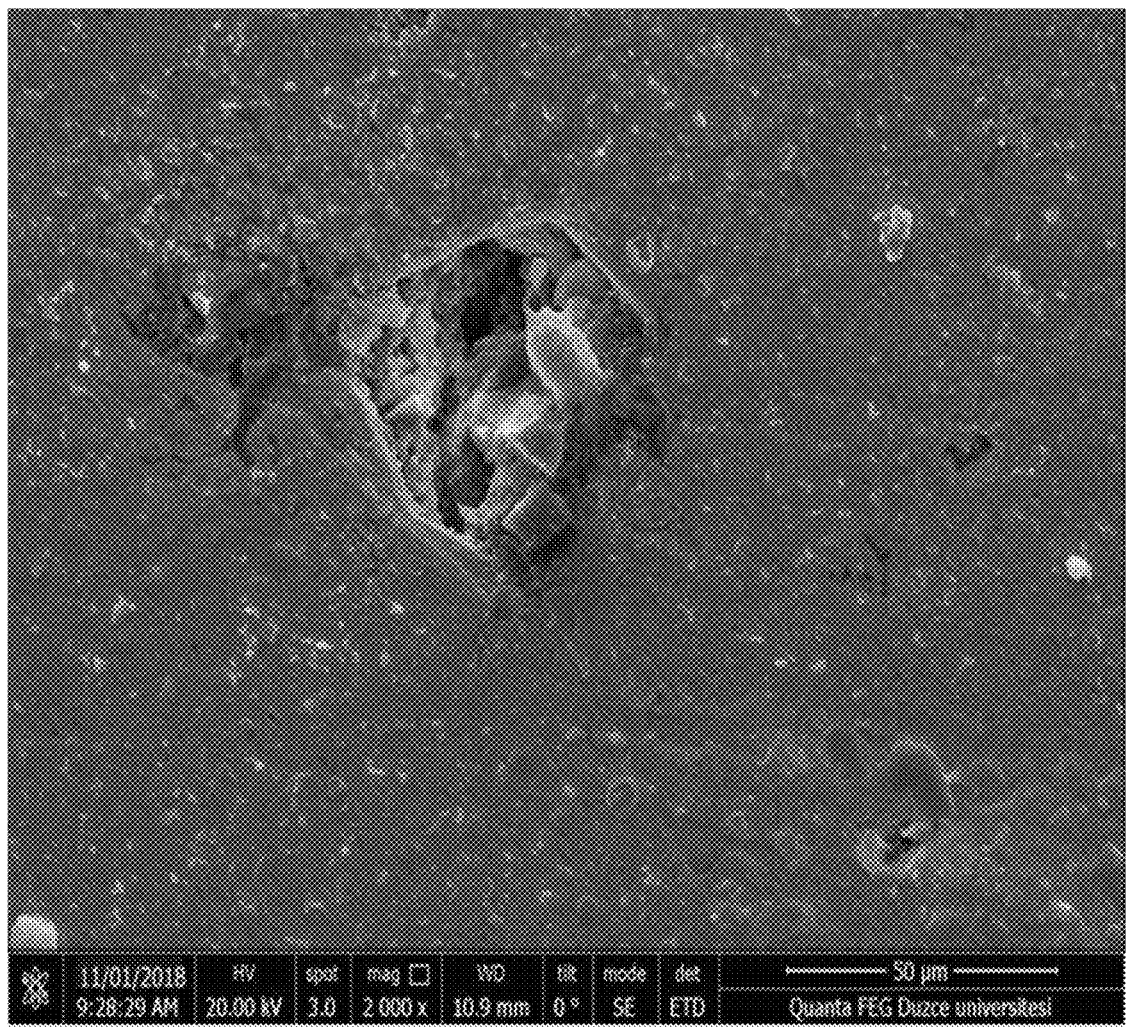
FIG. 12B: SEM micrograph of mild steel surface in 1 M HCl in the presence of OLE-Ti nano.

SEM micrographs of abraded mild steel coupons immersed in blank (1 M HCl) and 1 M HCl containing $10 \times 10^{-2}$ g/L OLE-Ti nano for 12 h were recorded by SEM. Results show that the surface of the metal sample in 1 M HCl solution devoid of inhibitor (FIG. 12A) was severely damaged by acid attack. When OLE-Ti nano was added to 1 M HCl (FIG. 12B), the OLE-Ti nano is seen to impart anticorrosive effect as evident in the clean surface devoid of roughness formation in the MS surface. This supports the adsorption of OLE-Ti nano on the MS surface forming a protective layer that inhibits corrosion.

Figure 13A:
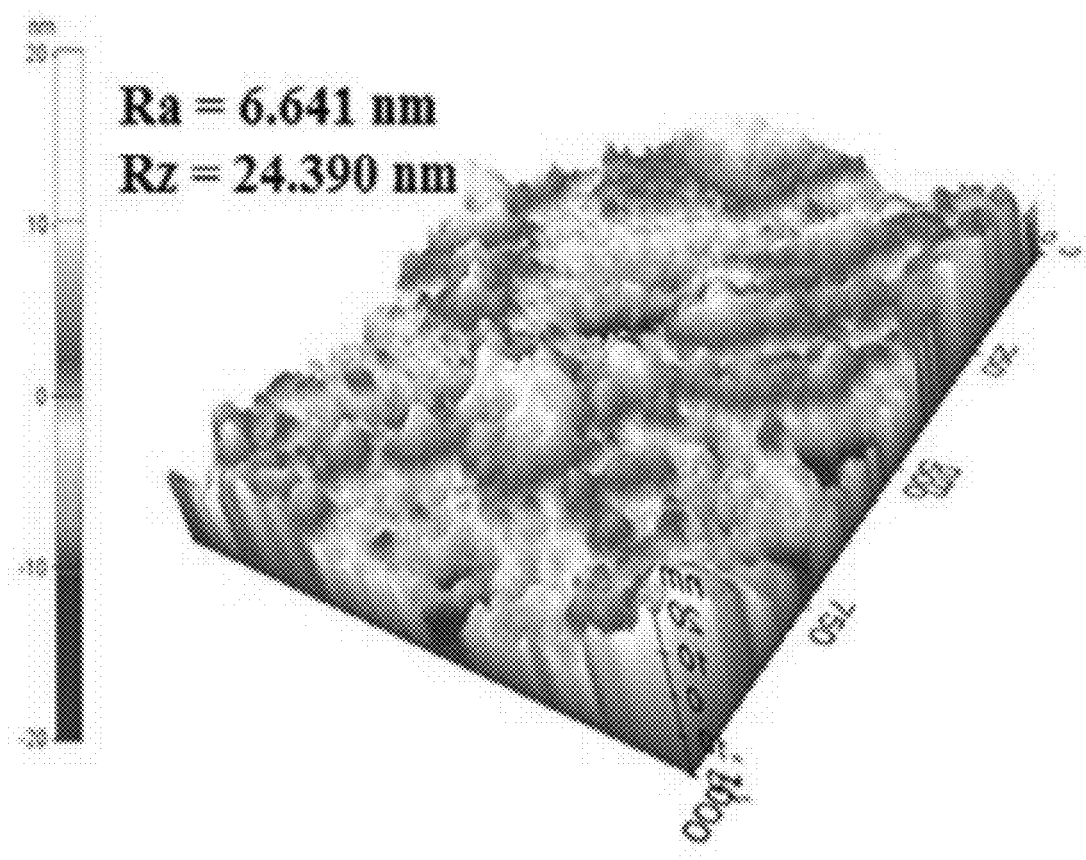
FIG. 13A: AFM micrograph of mild steel surface in 1 M HCl in the absence of OLE-Ti nano.
Figure 13B:
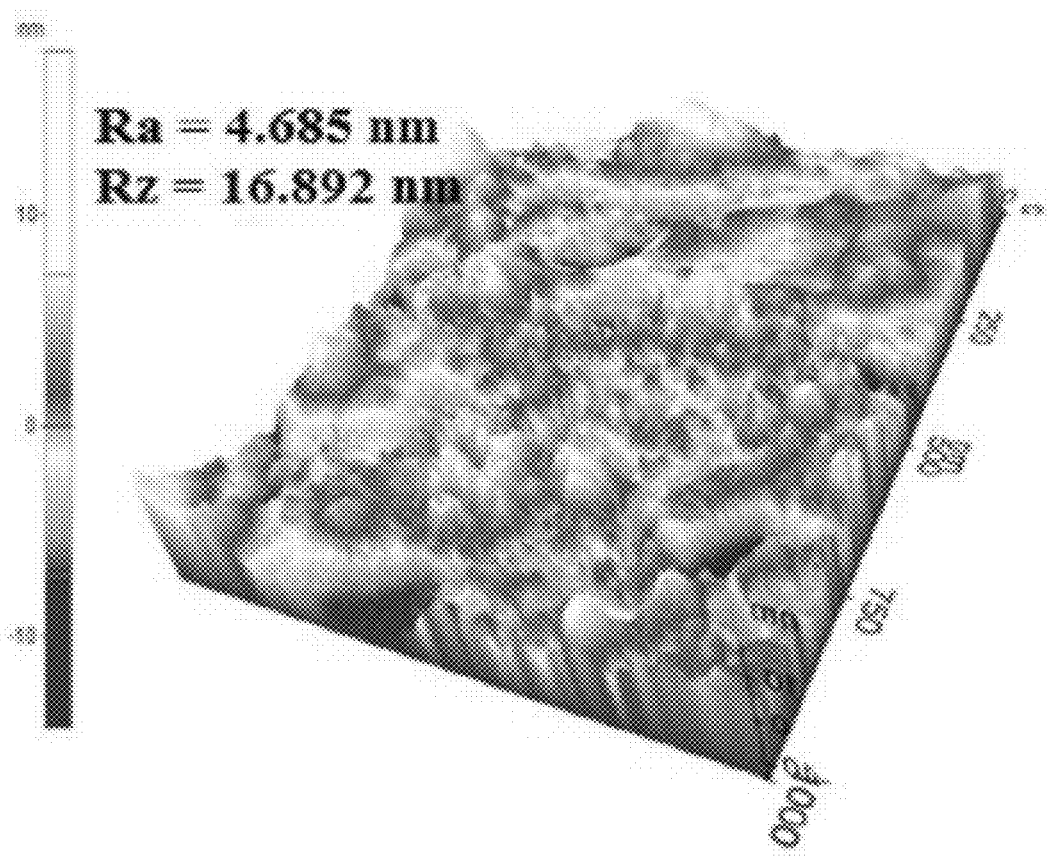
FIG. 13B: AFM micrograph of mild steel surface in 1 M HCl in the presence of OLE-Ti nano.

The 3D AFM images of the uninhibited and inhibited mild steel specimens are shown in FIGS. 13A and 13B respectively. The average roughness ($R_a$) and $R_z$ (defined as the average maximum peak to valley of five consecutive sampling lengths within the measuring length) for mild steel immersed in 1 M HCl without inhibitor for 24 h were 6.64 and 24.39 nm respectively. This high rough surface indicate that surface was badly damage due to acid attack on the surface. However, in the presence of concentration ($10 \times 10^{-2}$ g/L) of OLE-Nano, the $R_a$ and $R_z$ values were reduced to 4.69 and 16.89 nm respectively as could be seen in FIG. 13B. The lower values of the surface roughness in the presence of OLE-Nano is an indication that OLE-Nano protects the surface of mild steel in the acid environment.

The results can be summarized:
(1) The particle size of titanium nanoparticles in the composite is about 70-74 nm.
(2) OLE-Ti nano show maximum absorption at 420 nm.
(3) OLE-Ti nano show prominent FTIR peaks correspond to C=C, N—H, O—H and C=O functional groups.
(4) XRD spectrum of OLE-Ti nano shows four distinct diffraction peaks at 27.42°, 36.07°, 41.23°, and 54.30° corresponding to lattice plane value indexed at (101), (104), (200) and (211) planes of face centered cubic (FCC).

(5) OLE-Ti nano inhibits the corrosion of MS in 1 M HCl at 30-60° C. Inhibition effect is seen to be concentration and temperature dependent.
(6) The inhibition efficiencies of OLE and OLE-Ti nano are increased with increase in concentration but decreased with temperature rise. For instance the values of 83.5 and 94.3% were obtained at 30° C. and 51.7 and 85.4% at 60° C. respectively.
(7) Adsorption of OLE-Ti nano on MS is spontaneous, involving physical interactive forces and best described by Langmuir adsorption isotherm.
(8) OLE-Ti nano acts as mixed type inhibitor with anodic predominance from the potentiodynamic polarization results.

Advantages of OLE-Ti Nano Include:
Cheap raw material: Olive plants are cheap and efficient compared to the costly synthetic additives in use
Greenness: OLE-Ti nano is non-toxic unlike most synthetic products used commercially
Availability: Olive plants are readily available.
Easily extractible: Simple extraction technique was used for the extraction. Extraction does not involve complex processes.
Biodegradable: The Olive component is biodegradable. Ti nanoparticles is present only in minute amount.
Reducible cost of inhibitors for the oil and gas industries, petrochemical industries, cooling water systems, desalination technologies and metallurgical industries and prevents ecological disasters, which is a challenge with the currently used corrosion inhibitors.

The invention claimed is:

1. A method of inhibiting corrosion of steel, the method comprising:
forming an olive leaf extract titanium nanoparticles composite (OLE-Ti nano) by mixing an organic solvent extract of olive leaves with an alcohol, water, and $TiCl_4$,
mixing the OLE-Ti nano with a corrosive solution in contact with the steel to have a concentration of 5-500 ppm OLE-Ti nano in the corrosive solution.

2. The method of claim 1, wherein the OLE-Ti nano is in the form of a particle dispersion comprising particles having an average diameter in a range of 50-100 nm.

3. The method of claim 2, wherein particles comprise Ti metal.

4. The method of claim 3, wherein the Ti metal comprises crystalline Ti metal.

5. The method of claim 1, wherein the corrosive solution is an aqueous solution comprising a salt or an inorganic acid, the salt or the inorganic acid having a concentration in a range of 0.5-4 M.

6. The method of claim 5, wherein the inorganic acid is present, and wherein the inorganic acid is at least one selected from the group consisting of nitric acid, hydrochloric acid, hydrofluoric acid, sulfuric acid, and perchloric acid.

7. The method of claim 5, wherein the salt is present, and wherein the salt is at least one selected from the group consisting of a chloride salt, a carbonate salt, a bicarbonate salt, and a sulfate salt.

8. The method of claim 1, wherein the corrosive solution has a temperature in a range of 30-80° C.

9. The method of claim 1, wherein the steel comprises 0.05-1.0 wt % carbon relative to a total weight of the steel.

10. The method of claim 1, wherein a corrosion rate of the steel is 85-99.9% less than a substantially similar piece of steel in contact with a substantially similar corrosive solution that does not comprise OLE-Ti nano.

11. The method of claim 10, wherein a corrosion rate of the steel at 50-65° C. is 85-90% less than a substantially similar piece of steel in contact with a substantially similar acidic solution that does not comprise OLE-Ti nano.

12. The method of claim 10, wherein a corrosion rate of the steel at 25-50° C. is 9-99.9% less than a substantially similar piece of steel in contact with a substantially similar acidic solution that does not comprise OLE-Ti nano.

13. The method of claim 1, wherein the OLE-Ti nano comprises 0.5-1.2 M $TiCl_4$ immediately following the mixing.

14. The method of claim 1, wherein the OLE-Ti nano comprises 12-20 wt % alcohol relative to a total weight of the OLE-Ti nano, and wherein the alcohol is ethanol.

15. The method of claim 1, wherein the OLE-Ti nano comprises 0.5-2.0 wt % of the organic solvent extract of olive leaves immediately following the mixing, relative to a total weight of the OLE-Ti nano.

16. The method of claim 1, wherein the organic solvent extract of olive leaves is formed by contacting olive leaves with methanol, ethanol, acetone, 1-propanol or 2-propanol.

17. The method of claim 16, wherein the olive leaves are dried olive leaves.

18. The method of claim 16, wherein the contacting is for a period of 12-36 h.

19. The method of claim 1, wherein the steel is an electrode with a corrosion current density of 0.001-0.120 $mA/cm^2$ in the presence of 0.5-2 M inorganic acid at 20-35° C.

20. The method of claim 1, wherein an inhibition efficiency of the OLE-Ti nano is 10-70% greater than an inhibition efficiency of a substantially similar piece of steel in contact with a substantially similar corrosive solution that comprises organic solvent extract of olive leaves but does not contain Ti.

* * * * *